US012808499B1

(12) United States Patent
Massinello

(10) Patent No.: US 12,808,499 B1
(45) Date of Patent: Nov. 24, 2026

(54) ILLUMINATING DECORATION DEVICE

(71) Applicant: David Massinello, Royal Palm Beach, FL (US)

(72) Inventor: David Massinello, Royal Palm Beach, FL (US)

( * ) Notice: Subject to any disclaimer, the term of this patent is extended or adjusted under 35 U.S.C. 154(b) by 0 days.

(21) Appl. No.: 19/246,302

(22) Filed: Jun. 23, 2025

Related U.S. Application Data

(63) Continuation-in-part of application No. 18/385,054, filed on Oct. 30, 2023, now abandoned, which is a continuation of application No. 17/712,572, filed on Apr. 4, 2022, now Pat. No. 11,802,667, which is a continuation of application No. 17/074,174, filed on Oct. 19, 2020, now Pat. No. 11,293,605.

(60) Provisional application No. 62/925,595, filed on Oct. 24, 2019.

(51) Int. Cl.
*F21S 4/15* (2016.01)
*F21V 21/088* (2006.01)
*F21V 23/06* (2006.01)
*F21Y 115/10* (2016.01)

(52) U.S. Cl.
CPC .............. *F21S 4/15* (2016.01); *F21V 21/088* (2013.01); *F21V 23/06* (2013.01); *F21Y 2115/10* (2016.08)

(58) Field of Classification Search
CPC ..................................................... F21V 21/088
See application file for complete search history.

(56) References Cited

U.S. PATENT DOCUMENTS

| | | | | |
|---|---|---|---|---|
| 5,359,502 A * | 10/1994 | Cantin | A47G 33/06 | 362/123 |
| 6,076,938 A * | 6/2000 | Kinderman | F21S 4/10 | 362/151 |
| 6,607,284 B1 * | 8/2003 | Tsai | F21S 4/20 | 362/121 |
| 2003/0235053 A1 * | 12/2003 | Jones | F21V 21/088 | 362/147 |
| 2021/0178964 A1 * | 6/2021 | Kilim | G09F 13/16 | |

* cited by examiner

*Primary Examiner* — Eric T Eide
(74) *Attorney, Agent, or Firm* — John Rizvi; John Rizvi, P.A.—The Patent Professor®

(57) ABSTRACT

An illuminating decorative device comprising a plurality of electrically conducting wires interconnected together as a lattice or web including a plurality of lights that are electrically coupled to an electrical power strip having one or more connectors for connecting to an external power source, where the illuminating decorative device is configured into various ornamental shapes or patterns including for example, snowcaps, or a spider web. The illuminating decorative device is easily and quickly attachable to buildings and other surfaces such as rooftops as one integral unit to provide decorative illumination during holiday seasons or festive occasions or celebrations.

17 Claims, 17 Drawing Sheets

ILLUMINATING DECORATION DEVICE

CROSS-REFERENCE TO RELATED APPLICATION

This application is a Continuation-in-Part of U.S. patent application Ser. No. 18/385,054, filed on Oct. 30, 2023, which is a Continuation of U.S. patent application Ser. No. 17/712,572, filed on Apr. 4, 2022, which is a Continuation of U.S. patent application Ser. No. 17/074,174, filed on Oct. 19, 2020, issued on Apr. 5, 2022 with U.S. Pat. No. 11,293, 605, which in turn claims the benefit of U.S. Provisional Patent Application No. 62/925,595, filed on Oct. 24, 2019, both of which are incorporated herein by reference in their entirety.

FIELD OF THE INVENTION

The present invention relates generally to lighting systems and devices, and more particularly, to an illuminating decoration device configured into an ornamental shape and removably attached to buildings and other surfaces such as rooftops, to provide decorative appeal such as during holidays or celebrations.

BACKGROUND OF THE INVENTION

Individuals often labor to decorate their homes on certain holidays or celebrations. Many decorations include ornaments, sculptures, and banners that are generally displayed in windows, or placed in surrounding areas of residential homes. Certain holidays, such as Christmas and Halloween, often entail decorating with illuminating lights having different colors and designs. For instance, some lighting devices involve illuminated candles that are often placed along windowsills throughout homes, ornamental articles such as reindeer or snowman, or light ropes that are often wrapped around tree trunks, or disposed along railings. Common festive lights typically entail light strings that include a series of lights electrically attached to an elongate electrical wire having an electrical plug for connecting into a power receptacle. The light string comprises a variety of different lengths and is typically designed for use indoors and/or outdoors. There are a number of different light strings available on the market today for users to purchase. A differentiating feature found among light strings is the type of illuminating light bulb employed. For instance, many light bulbs have different styles, colors, shapes, and designs. Some light strings include light emitting diodes of different colors, and lights that are preformed to mimic icicles to provide ornamental appeal.

Light strings are commonly used by individuals to decorate both inside and outside residential homes, commercial establishments, schools, and other locations. It is quite common, when preparing for Christmas or other holiday season, for individuals to wrap one or more light strings around a tree, affix light strings along perimeters of windows, near eaves of roofs, along gutters, or on railings or bushes. Because conventional light strings typically include a smaller number of lights, multiple light strings are often needed to generate brighter lighting affects to enhance visual appeal to viewers. The use of multiple light strings can be frustrating, cumbersome, and time consuming to install. For instance, when installing light strings, individuals often have to untangle each individual light string before use, and diligently try to prevent the light strings from entangling with each other during the installation and removal process.

This task may prove difficult when the installing light strings on roof tops, or at greater heights. Laying out multiple light strings is also time consuming as each string must be correctly oriented and secured in place. The need for multiple light strings also results in cost increases.

Employing multiple, conventional light strings also makes it impractical and difficult for individuals to configure particular decorative layouts for festive occasions. For instance, creating a spider's web for Halloween would require both physically and electrically fastening a plurality of light strings together, in various configurations, and securing the light strings in place using a large number of fasteners. The task becomes more daunting when disassembling the decorative layout, as users have to remove the fasteners, electrically disconnect the coupled light strings from each other, and gather the light strings without the light strings becoming entangled with one another.

Accordingly, there is an established need for an illuminating decorative device that solves at least one of the aforementioned problems. For example, there remains a need for an illuminating decorative device that is formed into various ornamental configurations that is easily, quickly, and effectively attachable to buildings or other surfaces such as roof tops, using minimal effort and fewer fasteners, and is installable and removable as one integral unit.

SUMMARY OF THE INVENTION

The present invention is directed to an illuminating decorative device comprising a plurality of electrically conducting wires interconnected as a lattice, web or mesh that includes an electrical power strip having one or more connectors for connecting to an external power source, and includes a plurality of lights that are electrically coupled to the plurality of electrically conducting wires, where the illuminating decorative device is configured into various ornamental shapes including snow caps, and a spider web, that is quickly and easily attachable to buildings and other surfaces such as roof tops as one integral unit.

In a first implementation of the invention, an illuminating decorative device configured into an ornamental shape comprises a plurality of electrically conducting wires that are electrically interconnected to one another defining an integral web of wires, wherein the web of wires is configured to form the ornamental shape. A plurality of lights are carried by and in electrical communication with the plurality of electrically conducting wires along the ornamental shape. The device further includes an electrical power strip electrically connected to the plurality of electrically conducting wires. A first electrical connector is carried by and in electrical communication with the electrical power strip. The first electrical connector is configured to removably connect to an external power source to provide electrical power to the electrical power strip, the plurality of electrically conducting wires, and the plurality of lights to illuminate the plurality of lights.

In a second aspect, the first electrical connector may include a male connector.

In another aspect, the first electrical connector may be arranged on one end of the electrical power strip.

In another aspect, the illuminating decorative device may further include a second electrical connector carried by and in electrical communication with the electrical power strip. The second electrical connector may be compatible for disconnectably coupling with the first electrical connector.

In another aspect, the first and second electrical connectors may be arranged at opposite ends of the electrical power strip.

In yet another aspect, one of the first and second electrical connectors may be a male connector and the other of the first and second electrical connectors may be a female connector compatible for disconnectably coupling with the male connector.

In another aspect, the first electrical connector may be a male connector and the second electrical connector may be a female connector compatible for disconnectably coupling with the male connector.

In another aspect, the plurality of electrically conducting wires may extend from opposite sides of the electrical power strip.

In another aspect, the illuminating decorative device may further include one or more clamps configured to extend over a roof ridge and rest against opposite roof sides that converge into the roof ridge. Each clamp may have an opening for receiving and retaining the electrical power strip therewithin and thereby anchoring the electrical power strip to the roof ridge. Each clamp may further include two end segments arranged at an angle with one another and configured to rest against the opposite roof sides, respectively.

In yet another aspect, the end segments may be fixed relative to one another.

In another aspect, the end segments may be pivotable relative to one another to adjust the angle formed by the end segments.

In another aspect, the illuminating decorative device may further include a plurality of elongate bodies, each elongate body comprising a first longitudinal end configured to attach to an end segment of a corresponding clamp of the one or more clamps, and an opposite, second longitudinal end comprising a connector configured to secure a wire of the plurality of electrically conducting wires.

In another aspect, the connector may include a T-connector.

In yet another aspect, the ornamental shape may include an undulating outer contour provided by the plurality of electrically conducting wires. The connector may be secured to a wire of the plurality of electrically conducting wires at one of a peak and a valley of the undulating outer contour.

In another aspect, the first longitudinal end of each elongated body may be attached to a distal end of the end segment of the corresponding clamp.

In another aspect, an underside of the distal end of the end segment of the corresponding clamp may be provided with a non-slip surface.

In another aspect, the plurality of electrically conducting wires may include a plurality of first wires and a plurality of second wires forming a web with one another, and a perimeter wire extending along a perimeter of the web, wherein the first, second and perimeter wires are in electrical connection with each other.

In yet another aspect, the illuminating decorative device may further include a spring-loaded clamp comprising spring-loaded, first and second clamp members for disconnectably clamping onto a roof or other structure. The spring-loaded clamp may also include a wire receiver configured to receive and secure a wire of the plurality of electrically conducting wires.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word “exemplary” or “illustrative” means “serving as an example, instance, or illustration.” Any implementation described herein as “exemplary” or “illustrative” is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms “upper”, “lower”, “left”, “rear”, “right”, “front”, “vertical”, “horizontal”, and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward an illuminating decorative device comprising a plurality of electrically conducting wires defining a lattice or web of electrical wires including a plurality of lights electrically coupled to a power strip having a male and female electrical connector, where the illuminating decorative device includes various ornamental configurations including snow caps, and a spider web that is easily and quickly attachable to, and removable from, a building or other surface by clamps and clamp extenders, as one integral unit.

Figure 1:
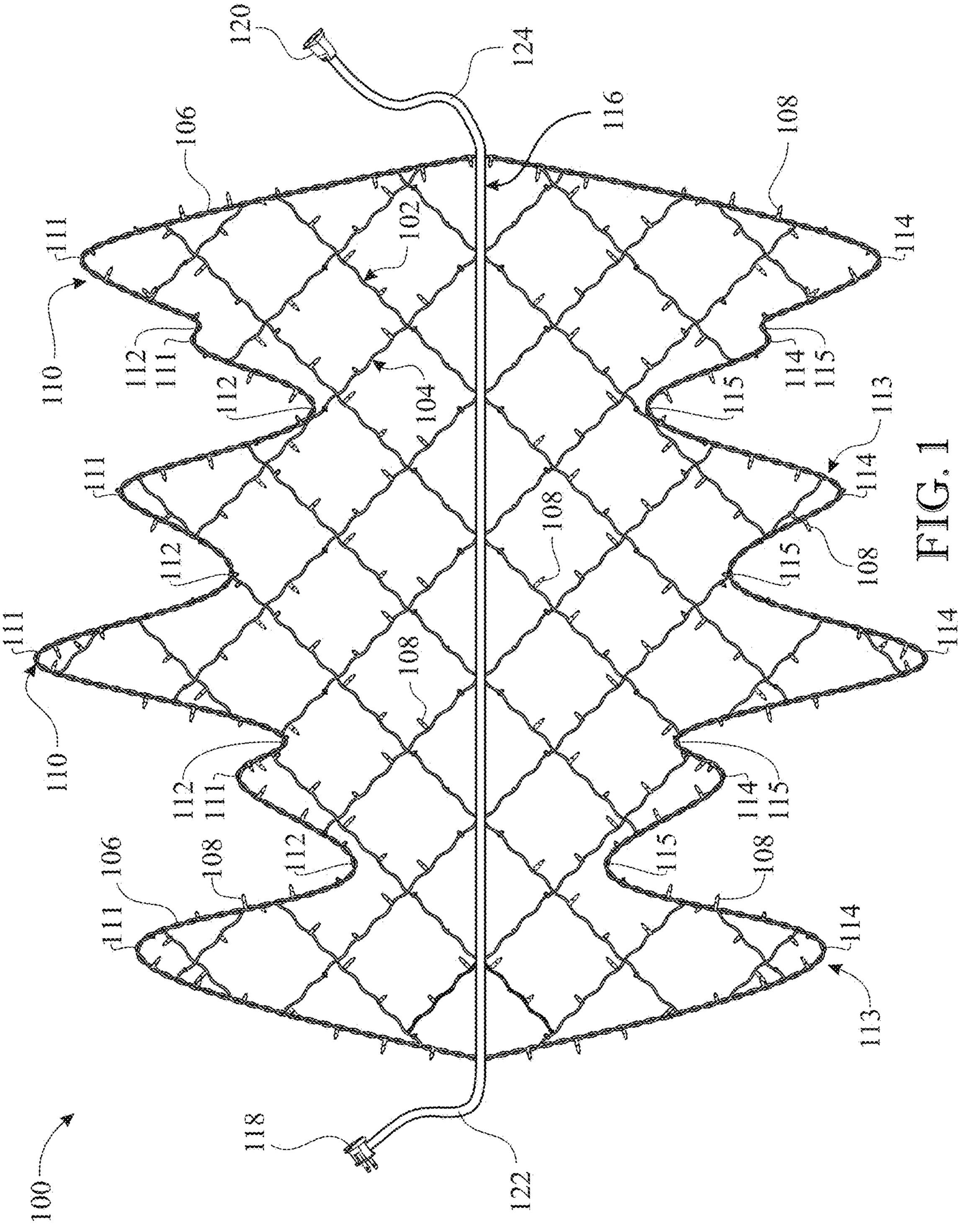
FIG. 1 presents a top plan view of an illuminating decorative device including a plurality of electrical wires interconnected to form a lattice or web of electrical wires including a plurality of lights that are electrically coupled to an electrical strip including a male and female electrical connector, where the illuminating decorative device is configured in the ornamental shape of snow caps, in accordance with one embodiment of the present invention.

Referring initially to FIG. 1, there is shown a top plan view of an illuminating decorative device 100 shown in fully extended, flat configuration. The illuminating decorative device 100 includes a plurality of electrically conducting wires oriented in parallel and perpendicular relative arrangement, and along an outer perimeter, the plurality of wires comprising a set of wires 102 arranged in a first direction, a set of wires 104 arranged in a second direction at an angle with (e.g., generally perpendicular to) the wires 102 thereby forming a mesh-type arrangement, and a set of wires 106 arranged along an outer perimeter of the mesh, extending from the outer ends of the wires 102 and 104, and carried by said outer ends. The wires 102, 104 and 106 may each be formed of one or more cables or cable segments, and may hereinafter be referred to indistinctly in the singular form (“wire”) or the plural form (“wires”). The wires 102, 104, and 106 and are electrically connected together or interconnected, or are interlaced together using a single length of wire, in a preferably non-disconnectable manner relative to one another to define an integral electrically conductive web or lattice.

The perimeter of the web or lattice of electrically conducting wires, or wire 106, and the wires 102 and 104 extending therewithin, are configured such that the perimeter or wire 106 is formed in the present embodiment to mimic the outer boundary of snowcaps. For example, the present embodiment includes a plurality of snowcaps 110 and a plurality of snowcaps 113 on opposite sides of the electrical power strip 116. Snowcaps 110 are formed as undulations having alternating outwardly-extending peaks 111 and inwardly-extending valleys 112. Similarly, snowcaps 113 are formed as undulations having alternating outwardly-extending peaks 114 and inwardly-extending valleys 115.

The snowcaps 110 and 113 can be formed using various techniques. In one technique, the electrically conducting wire 106 may comprise a bendable electrical wire, or a wire that is preformed or pre-shaped into the ornamental configuration of snowcaps. In another technique, the snowcaps 110 and 113 are formed by the combinational interconnection of wires 102, 104, 106 having different lengths, such that the length of interconnected wires 102 and 104 causes the perimetral wire 106—which is carried by the ends of the interconnected wires 102 and 104—to acquire the undulating, snowcap shape. Electrically conducting wires 102, 104, 106 may comprise well-known electrical wires that are typically used for manufacturing light strings, and may comprise for example copper, copper-nickel or other conductive metal material having a predetermined wire gauge for safely conducting power. In the preferred embodiment, each electrically conducting wire 102, 104, 106 is coated with a protective sheath including a rubber, plastic, thermoplastic, or elastomer material for resisting or repelling water, where the protective sheath may comprise distinctive colors. For instance, the protective sheath of electrically conducting wire 106 may include a white color designed to mimic the color of snow typically seen on snowcaps. The electrically conducting wires 102, 104, 106 are designed for use indoors and/or outdoors as the illuminating decorative device 100 will be secured to outside surfaces during use. It is appreciated that the size, shape and layout of the illumination decorative device 100 is further defined by the length, size, and number of electrically conducting wires 102, 104, 106 employed.

The illuminating decorative device 100 includes a plurality of lights 108 that are each electrically attached to the electrically conducting wires 102, 104, 106, and electrically coupled to an electrical power strip 116 having at least one electrical connector configured to disconnectably connect to an external power source (e.g., a wall socket or electrical wire extender) and thereby provide electrical communication between the external power source and the electrical power strip 116. For instance, the electrical power strip 116 may include a first electrical connector (e.g., a male connector 118) at one end, and a second electrical connector (e.g., a female connector 120) at an opposite end. The plurality of lights 108 include any number of lights each comprising the same or different color and each having a transparent, translucent, or opaque cover, and each having a same or different shape, or any combination thereof. In one non-limiting embodiment, each of the plurality of lights 108 comprises a light emitting diode (LED), and organic light emitting diode (OLED), or an incandescent light bulb. In a preferred embodiment, each of the plurality of lights 108 includes an energy efficient, low current, light emitting diode having a predefined power, voltage and current rating. For added convenience, in some embodiments, each light 108 includes a base that is electrically coupled to the electrically conducting wires 102, 104, 106 and to the electrical power strip 116. An LED is removably insertable within each base to allow users to easily interchange, or replace LED's. In one non-limiting example, each of the plurality of lights 108 is powered to illuminate by an alternating AC 120 volt, 60 Hz power source typically provided at electrical household outlets in some countries/regions. In other embodiments, the plurality of lights 108 may be powered by other alternating AC configurations or by a direct current DC voltage source.

The illuminating decorative device 100 may include an electrical module that includes one or more of a voltage or current regulator, a step down transformer, a voltage converter, an on/off timer, a programmable on/off timer, a light control circuit to control operative duty cycles of the lights 108 such as controlling steady on, blinking or flashing modes, one or more fuses to provide power overload or short circuit protection, and a wireless receiver or transceiver that receives or transmits a generated signal, or any combination thereof, to control the operative function or mode of the lights 108.

The electrical power strip 116 generally includes two or more electrical wires that are encased within a protective sheath, such as corresponding to the ground, neutral and hot power source connections. The encased wires of the electrical power strip 116 are electrically coupled to the plurality of lights 108, via, electrically conducting wires 102, 104 and 106. The electrical power strip 116 includes the aforementioned electrical male connector 118, which may have two prongs representing hot and neutral power connections, or three prongs representing hot, neutral and ground power connections, and the aforementioned corresponding female connector 120. The electrical plug configuration of each connector 118, 120 is compatible for use with standard 110/220 V, 60 Hz, type A or B systems, however other first and second connector types such as type C through N may be implemented. Opposite end segments 122, 124 of the electrical power strip 116, which carry and are electrically connected to the connectors 118 and 120, respectively, may extend outward of the perimeter wire 106 such that the connectors 118 and 120 are thereby spaced-apart from the perimeter wire 106 to facilitate operative connection between sequentially connected illuminating decorative devices 100, or the connection of extension cords for electrically coupling the illuminating decorative device 100 to a remote power receptacle. It is appreciated that two or more illuminating decorative devices 100 may be electrically connected together by simply connecting the male connector 118 of one illuminating decorative device 100 to the female connector 120 of another illuminating decorative device 100. As illustrated in FIG. 1, whoever, the illuminating decorative device 100 (i.e., a single unit thereof) provides a single, integral unit that may be easily transported and carried as a whole without the need for attaching or transporting multiple, separate and distinct light strings as is the case with the prior art.

Figure 2:
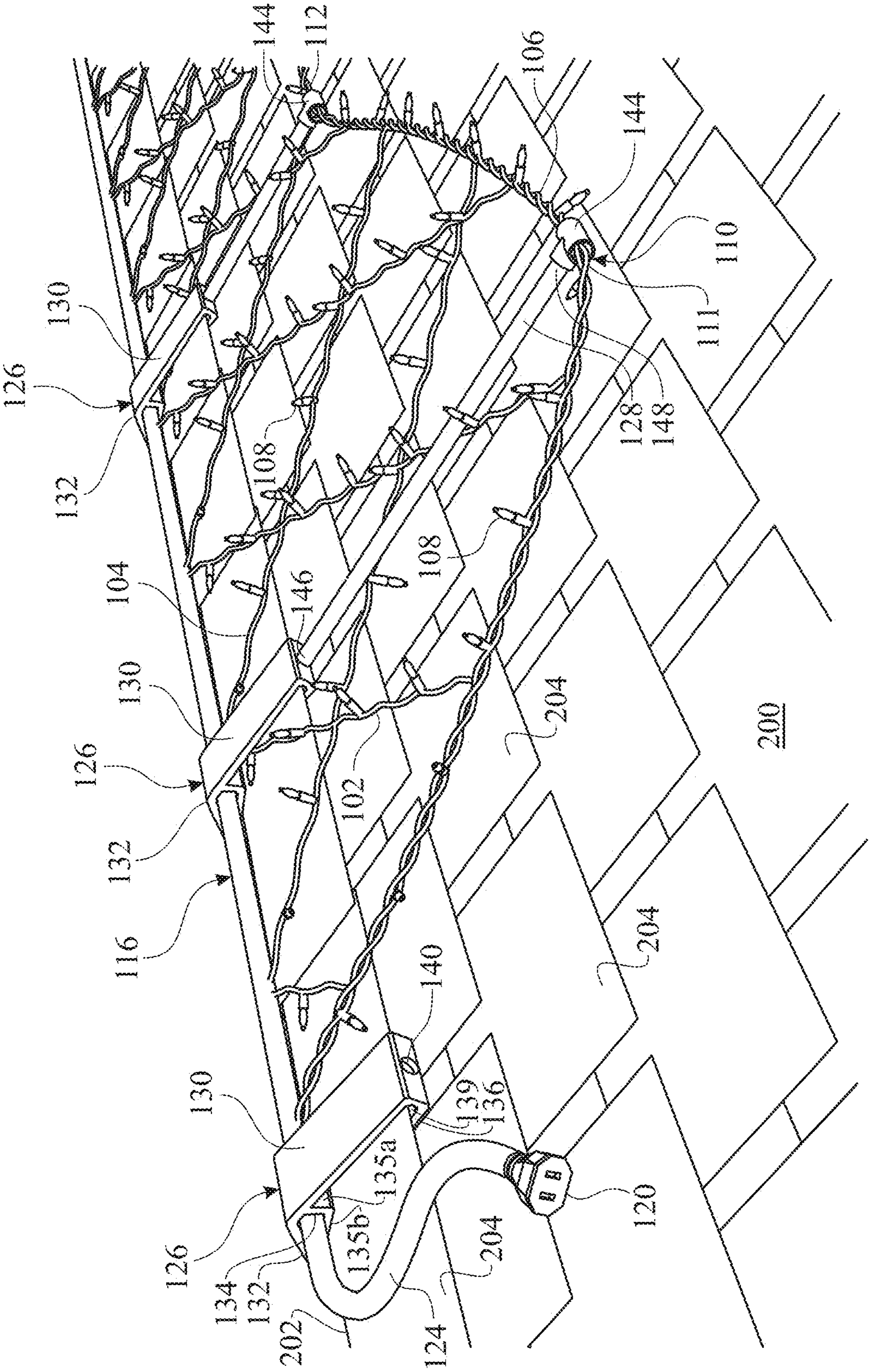
FIG. 2 presents a partial, top view of a roof of a building, showing a portion of the illuminating decorative device of FIG. 1 installed on the roof with clamps and a clamp extenders, and configured into the shape of snow caps displaced on opposite planar sides of the roof.

Turning now to FIG. 2, there is shown a partial, top perspective view of a roof 200 of a building, showing a portion of the illuminating decorative device 100 installed on the roof 200. The illuminating decorative device 100 includes stabilizers or clamps 126, and stabilizer or clamp extenders 128 formed as elongated bodies extending from the clamps 126. The decorative device 100 is configured in the shape of snow caps 112 that are displaced on opposite planar sides of the roof 200. Each clamp 126 includes a first segment 130 and a second segment 132, wherein the first and second segments 130 and 132 are formed integrally with one another and form an inverted V-shape configured to engage the apex or ridge 202 of a roof 200. Each clamp 126 further includes a channel 134 providing a strip-receiving space or opening for receiving and retaining a portion of the electrical power strip 116 therein. Each clamp 126 further includes rearward- or inward-bent ends, or curvatures 136 (FIG. 2) and 138 (FIG. 4), forming a respective slot 139 for receiving part of a roof shingle 204 for holding the clamp 126 in place, and extender apertures 140 (FIG. 2) and 142 (FIG. 4) provided on the distal ends of each segment 130 and 132, respectively, to receive an end of a clamp extender 128. In some embodiments, each channel 134 may be defined by a tubular body fully encircling the channel 134; for example, as shown, each channel 134 may be defined by a tubular body formed by two parallel side walls **135*a* ending in a closed end or end wall 135*b*, where the walls 135*a*, 135*b* encircle the channel 134 or wire-receiving space or opening to receive a portion of the electrical power strip 116. In other embodiments, each channel 134 may be defined by a split tubular body or open-ended tubular body; for example, each channel 134 may include two side walls 135*a* ending in an open end (i.e. with no end wall 135*b*). The segments 130, 132 may comprise any width and/or length. Each clamp 126 is used to steadily secure the electrical power strip 116 along the ridge 202 of the roof 200, and firmly hold the illuminating decorative device 100 in place. As shown in FIG. 2, clamps 126 are held in place using both the weight of the power strip 116, and by inserting a portion of a shingle 204 within the slots 139 formed by the curvatures 136 and 138. It is appreciated that one or more holes can be formed through the body of each segment 130, 132 of the clamp 126 to fasten the clamp 126 to the roof 200 using particular fasteners that preferably do not penetrate the roof to prevent leakage. Each clamp extender 128 includes a proximal or first end 146 that is inserted into a respective extender aperture 140 (FIG. 2) or 142 (FIG. 4), and a distal or second end 148 that includes a T-connector 144 having an opening for receiving and holding an electrically conducting wire 106. Each T-connector 144 may include a slot for easily inserting or removing the electrically conducting wire 106, such that the T-connector 144 has a C-shaped, transverse cross section. The first end 146 of the clamp extender 128 may include a threaded end, a bayonet end, a spring detent, or other quick attachment to easily and quickly attach the first end 146 of the clamp extender 128 into each extender aperture 140, and 142 when installing the illuminating decorative device 100. In turn, the second end 148 of the clamp extender 128 may be permanently-attached (such as by an adhesive), integrally-formed with (such as by injection molding) or non-permanently attached (such as by a threaded or bayonet connection) to the T-connector 144. In one embodiment, the clamps 126 and clamp extenders 128 are constructed from a lightweight material such as a durable plastic, or nylon material. However, to provide added weight, the clamps 126 and clamp extenders 128 may be constructed from a metal material including aluminum, galvanized steel, or stainless steel designed to resist rust. In some embodiments, the clamp extender 128 may be rigid, such as, but not limited to, a rigid bar or tube. In other embodiments, the clamp extender 128 may be flexible, and preferably non-stretchable, such as, but not limited to, a rubber, hose, wire, strap, or chain. The clamp extender 128 may include any shape and dimension including round, square, or flat. In one embodiment, clamp extender 128 includes a locking, telescoping body that allows users to easily adjust the desired length of the extender 128 during use when installing the illuminating decorative device 100, so that the plurality of extenders 128 may be adjusted to varying lengths. In one alternative embodiment, each clamp extender 128 may include a plurality of individual extender segments each having the same or different predetermined length in which the extender segments are attached together in sequence to provide a desired length. Both the clamps 126 and clamp extenders 128** may comprise any desired shape, design, size, or pattern.

Figure 3:
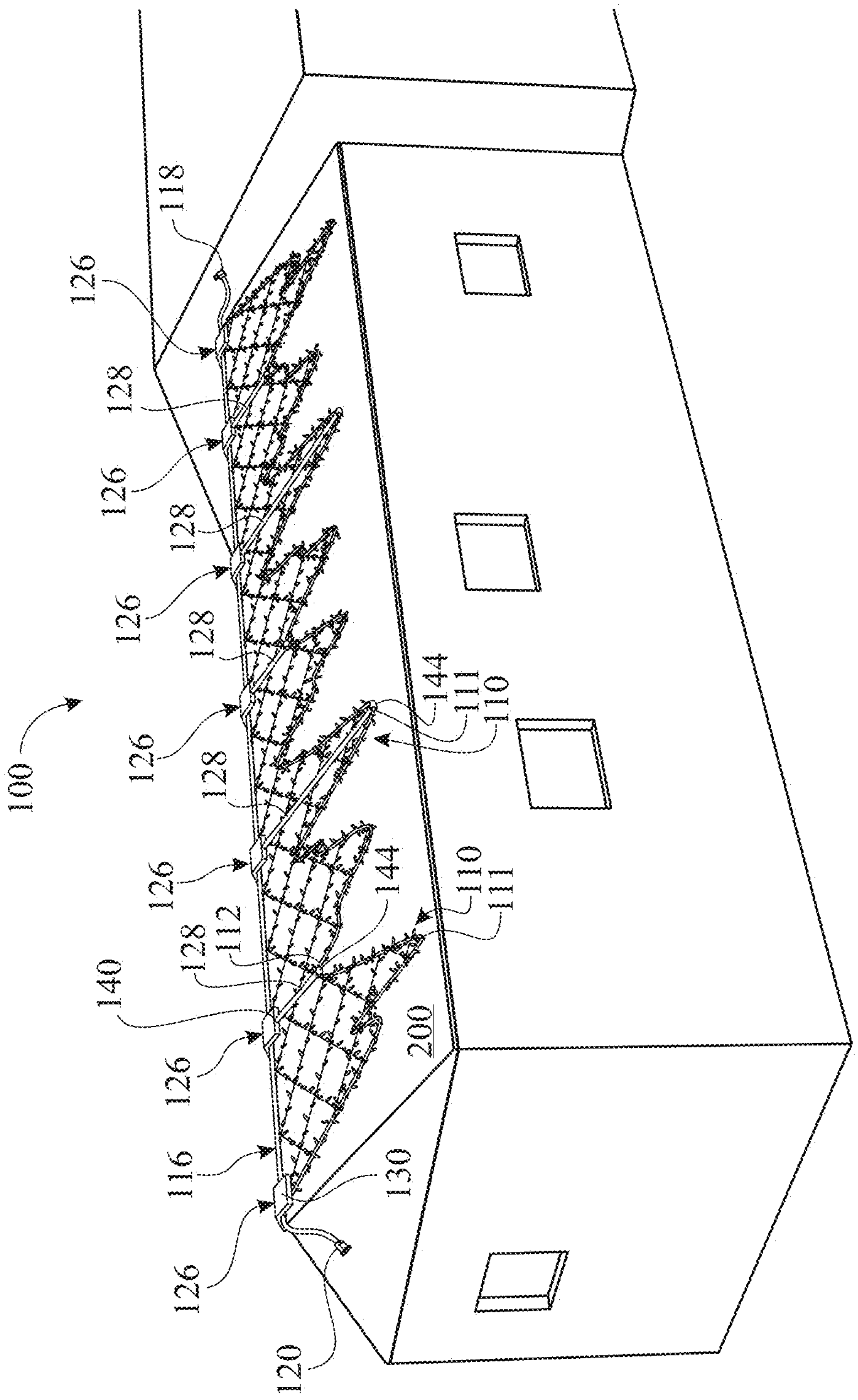
FIGS. 3 and 4 present right and left perspective views, respectively, of the building, of FIG. 1 showing the illuminating decorative device installed on the roof with clamps and clamp extenders, the electrical strip extending along the apex or ridge of the roof, and the device configured into the shape of snow caps displaced on opposite planar sides of the roof.
Figure 4:
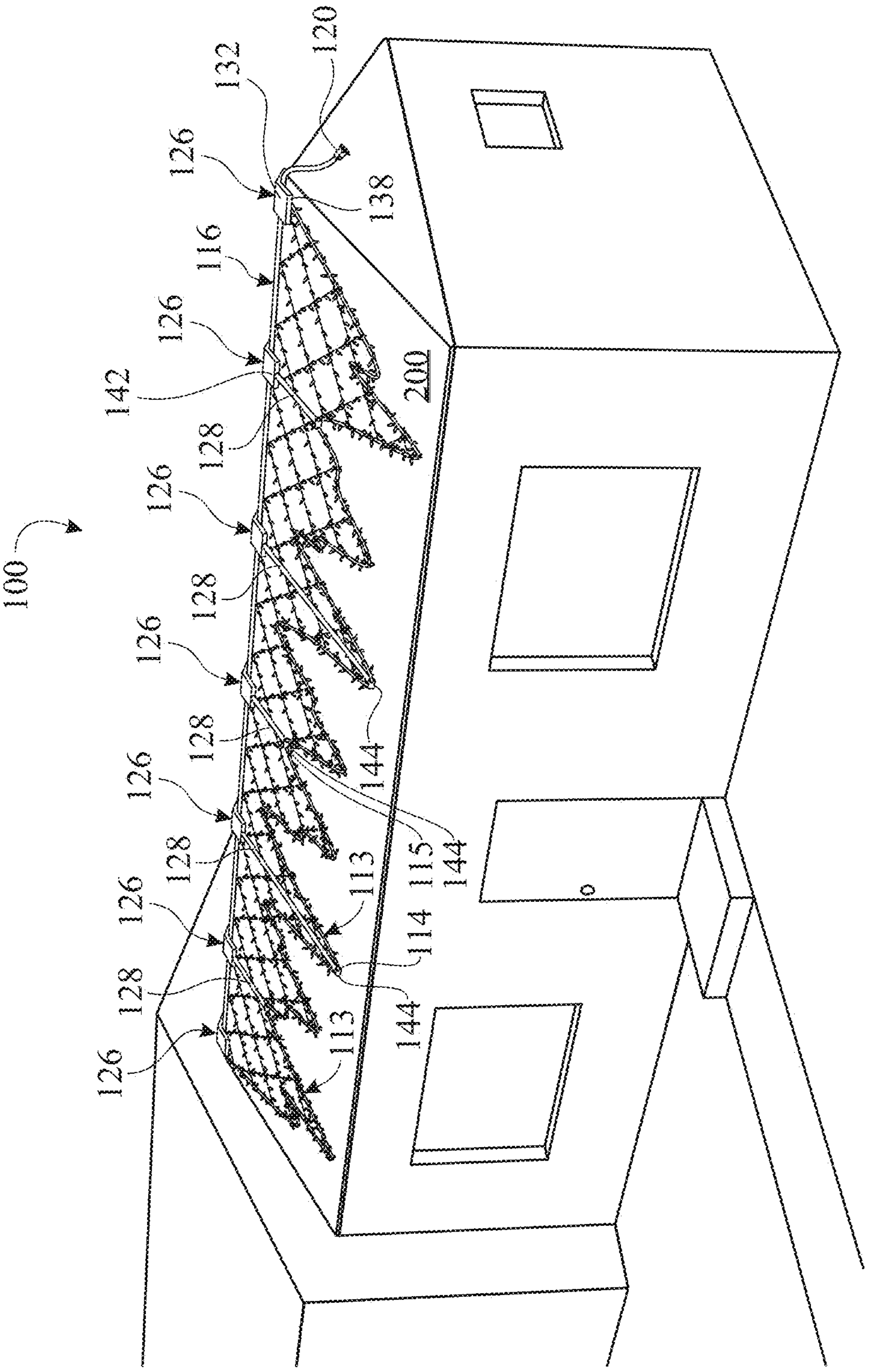

With reference made to FIGS. 3 and 4, there is depicted a right and a left perspective view, respectively, showing the illuminating decorative device 100 securely installed on the roof 200 of a building with clamps 126 and clamp extenders 128, with the electrical power strip 116 extending along the ridge 202 (FIG. 2) of the roof 200, and the decorative device 100 configured with snow caps 110 and 113 displaced on opposite planar and downward-sloped sides of the roof 200. The clamps 126 are used to retain the electrical power strip 116 in place on the roof 200. The electrical power strip 116 extends within each channel 134 of each clamp 126 along the ridge 202 of the roof 200. In turn, the clamp extenders 128 secure the illuminating decorative device 100 in place where, as described heretofore, the first end 146 of each clamp extender 128 is attached to respective extender apertures 140, 142 of each clamp 126, and the opposite second end 148 of each clamp extender 128 includes the aforementioned T-connector 144 having an opening for receiving a portion of the electrically conducting wire 106 there through. As shown, each clamp extender 128 comprises a different length for accommodating the configuration of snowcaps along the roof 200. More preferably, as shown, each clamp extender 128 is configured to secure to a peak or a valley of a snowcap, further contributing to maintain the snowcap-shape of the illuminating decorative device 100. The male 118 and female 120 electrical connector each extend outwards to provide easy access to electrically connect the illumination decorative device 100 to an electrical receptacle using one or more electrical extension cords if needed.

Although a single illuminating decorative device 100 is shown in FIGS. 3 and 4, it is understood that multiple illuminating decorative devices 100 may be used and electrically connected together, for decoration by simply connecting the male connector 118 of one illuminating decorative device 100, to a female connector 120 of another illuminating decorative device 100. The plurality of electrically conducting wires 102, 104, 106 are coupled together as a web or lattice that permits users to both easily install, and remove the illuminating decorative device 100 as one integral unit without having to spend time, effort, and money installing or removing multiple light strings using a greater number of fasteners.

Figure 5:
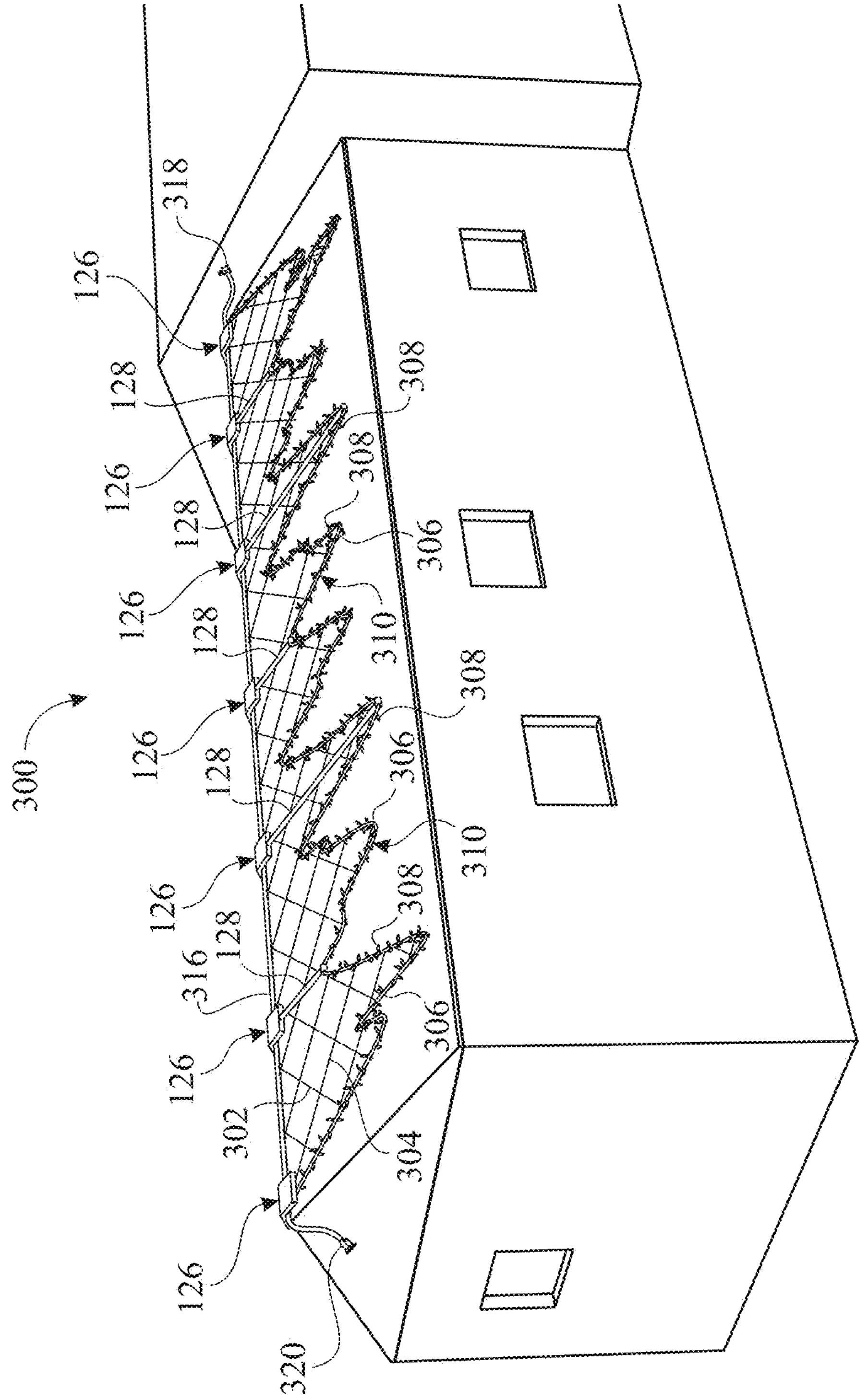
FIG. 5 presents a right perspective view of the building of FIG. 3, showing an illuminating decorative device installed on the roof, and including a web of electrical wires having fewer plurality of lights electrically coupled to an electrical strip, where the illuminating decorative device is secured to the roof with clamps and clamp extenders and configured into the shape of snow caps displaced on opposite planar sides of the roof.

With reference made to FIG. 5, there is shown a right perspective view, respectively, showing an illuminating decorative device 300 securely installed on the roof 200 of a building with clamps 126 and clamp extenders 128, with an electrical power strip 316 extending along the ridge 202 of the roof 200, and the illuminating decorative device 300 configured into the shape of snowcaps that are displaced on opposite planar sides of the roof 200. The illuminating decorative device 300 is similar in operation, and includes the same elemental features as that of device 100 with the exception of using fewer lights 308. As shown, the mesh-type-arrangement of electrical conducting wires 302 and 304 is devoid of illuminating lights 308 (in some embodiments, some or all of the mesh-forming wires 302 and 304 may in fact be non-electrically-conductive). The plurality of lights 308 are electrically coupled to the perimetral, electrically conducting wire 306. The perimeter of the web or lattice of electrically conducting wires 302, 304, 306 is formed to mimic the outer boundary of snowcaps 310 comprised of alternating inwardly-extending valleys and outwardly-extending peaks, similarly to the previous embodiment. The snowcap configuration can be formed using various techniques, similarly to the previous embodiment. In one technique, the electrically conducting wire 306 may comprise a bendable electrical wire, or a wire that is preformed or pre-shaped into the ornamental configuration of snowcaps. In another technique, the snowcaps are formed by the combinational interconnection of wires 302, 304, 306 having different lengths, such that the length of interconnected wires 302 and 304 causes the perimetral wire 306—which is carried by the ends of the interconnected wires 302 and 304—to acquire the snowcap shape. The clamps 126 retain the electrical power strip 316 in place along the ridge 202 of the roof 200. The electrical power strip 316 extends within each channel 134 provided on each clamp 126. Clamp extenders 128 are employed to secure the illuminating decorative device 300 in place. One end of each clamp extender 128 is attached to respective extender apertures 140, 142, of each clamp 126, and another end of each clamp extender 128 includes a T-connector 144 having an opening for receiving a portion of the electrical wire 306 there through. As shown, each clamp extender 128 comprises a different length for accommodating the configuration of snowcaps 310 on opposite planar sides of the roof 200. Each clamp extender 128 may extend between a clamp 126 and the perimeter wire 306 at one of a peak or a valley of a snowcap 310, similarly to the present embodiment. The male 318 and female 320 electrical connector each extend outwards from the sides to provide easy access to electrically connect the illumination decorative device 300 to an electrical outlet using one or more electrical extension cords if needed. Although a single illuminating decorative device 300 is shown in FIG. 5, it is understood that multiple illuminating decorative devices 300 may be used and electrically connected together, for decoration. It is appreciated that illuminating decorative device 100 may be electrically connected to a different illuminating electrical device 300 if desired to provide different forms of ornamental illumination.

Figure 6:
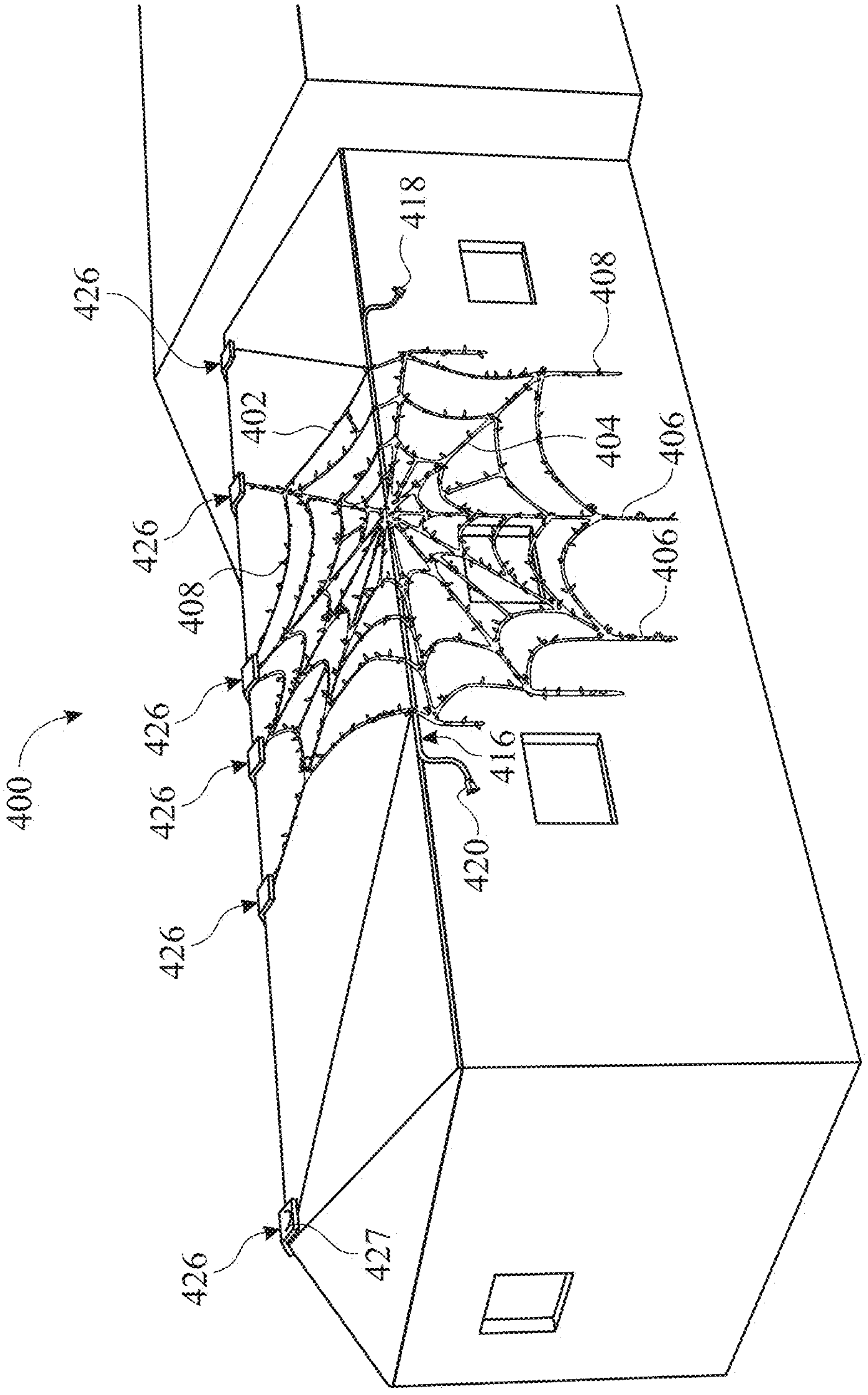
FIG. 6 presents a perspective view of a building, showing an illuminating decorative device including a plurality of electrical wires interconnected to form a lattice or web of electrical wires including a plurality of lights that are electrically coupled to an electrical strip including a male and female electrical connector, where the illuminating decorative device is configured in the ornamental shape of a spider web, in accordance with another embodiment of the present invention.

Turning to FIG. 6, there is shown a perspective view of a building, and an illuminating decorative device 400 including a plurality of electrically conducting wires represented at 402, 404, 406, a plurality of lights 408 electrically coupled to an electrical power strip 416 having a first electrical connector (e.g., a male connector 418), and a second electrical connector (e.g., a female connector 420), where the illuminating decorative device 400 is configured as a spider web for use during the festive Halloween season, according to another embodiment of the present invention. The illuminating decorative device 400 includes a plurality of lights 408, the same in form, design, and construction as lights 108, each electrically coupled to the electrical power strip 416 via electrically conducting wires 402, 404 and 406. The plurality of lights 408 may include any number of lights each comprising the same or different color having a transparent, translucent, or opaque cover with a same or different shape, or any combination thereof. In one non-limiting embodiment, each of the plurality of lights 408 may include a light emitting diode (LED), and organic light emitting diode (OLED), or an incandescent light bulb. In a preferred embodiment, each of the plurality of lights 408 includes an energy efficient, low current, light emitting diode having a predefined power, voltage or current rating. Each of the plurality of lights 408 are powered to illuminate by an alternating or direct current (AC or DC) voltage source.

As with illuminating decorative devices 100, and 300, the illuminating decorative device 400 may include an electrical module including a voltage regulator, a step down transformer, a voltage or current converter, an on/off timer, a programmable on/off timer, a light control circuit to control operative duty cycles of the lights 408 such as controlling steady on, blinking or flashing modes, one or more fuses to provide power overload or short circuit protection, and a wireless receiver or transceiver that receives and/or transmits signals, or any combination thereof, to control the operative function of the lights 408.

The electrical power strip 416 generally includes the same electrical features, elements and functionality of electrical power strip 116 and 316. The electrical male connector 418 may have two prongs representing hot and neutral power connections, or three prongs representing hot, neutral and ground power connections, and a corresponding female connector 420. Portions of the illuminating decorative device 400 are attached to clamps 426 that each have similar characteristics to that of clamps 126 with the exception of the addition of one or more hooks 427 provided on the body of each clamp 426 to affix an attachment cord, or portions of electrical wires 402, 404, and 406. During installment, the electrical power strip 416 is attached along the eave of the roof 200, or alternatively along a gutter using any well-known fastener such as clips, or brackets. As shown in FIG. 6, a portion of the spider web formed by the illuminating decorative device 400 extends over the planar surface of the roof, and another portion of the spider web extends downward along the outer surface of the building. The illuminated spider web provides ornamental visual appeal, and the illuminated thrill of Halloween decorations. It is appreciated that the illuminating lights 408 provided along the wires 406 may comprise a red color to signify blood, where the other lights 408 comprise a different color. The plurality of electrically conducting wires 402, 404, 406 are coupled together as a web or lattice that permits users to both easily install, and remove the illuminating decorative device 400 as one integral unit without having to spend time, effort, and money installing or removing multiple light strings using a greater number of fasteners.

Figure 7:
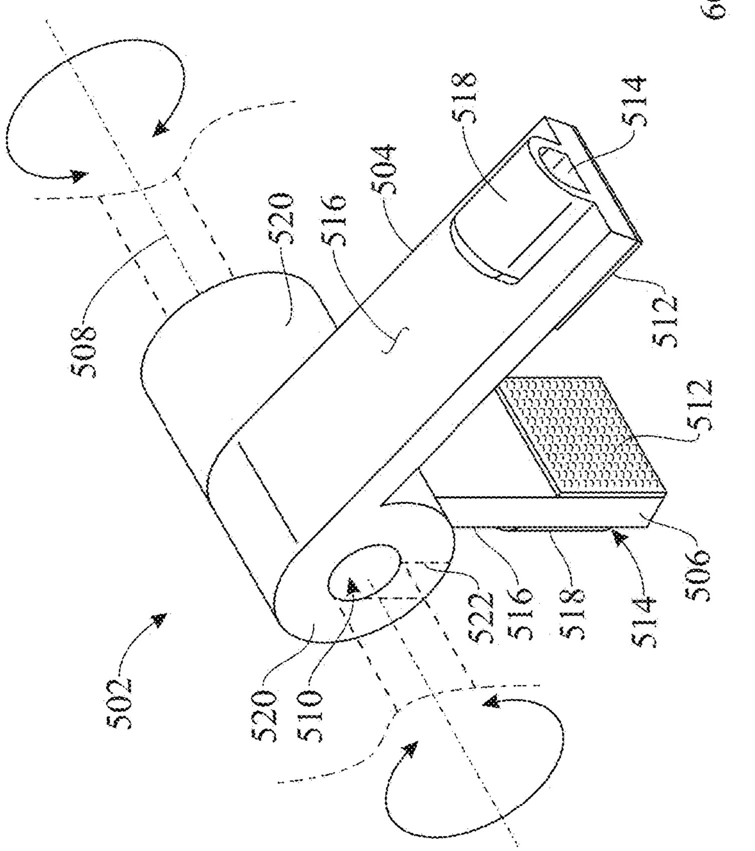
FIG. 7 presents an isometric view of an alternative embodiment of a clamp configured to secure the illuminating decorative device at a roof ridge.

The illustration of FIG. 7 shows a further embodiment of the invention, in which the illuminating decorative device is provided with an alternative clamp 502 to those described heretofore. Similarly to previous embodiments, the clamp 502 may include a first segment 504 and a second segment 506 arranged at an angle with one another to form a V-shaped arrangement. However, in the present embodiment, the first segment 504 and second segment 506 are not fixed with respect to one another; rather, the first and second segments 504 and 506 are pivotable relative to each other about a rotation axis 508 and the angle formed by the first segment 504 and second segment 506 is thereby adjustable, allowing the clamp 502 to conform to different roof geometries and angles. In some embodiments, the first and second segments 504 and 506 may be further pivoted to a coplanar position, i.e., a position in which the segments 504 and 506 are arranged at 180 degrees with one another, allowing the clamp 502 to rest on a flat surface. In some embodiments, the first and second segments 504 and 506 may be connected to each other by a hinge or other pivotable connection. Similarly to clamps 126 and 146 described heretofore, a central portion 520 of the clamp 502 (i.e. a respective proximal portion of each segment 504 and 506) may be formed as a closed tubular body, which may include a through channel 510 for allowing the passage therethrough of an electrical power strip of the illuminating decorative device, similarly to channel 134 described heretofore. In other embodiments, the central portion 520 defining the channel 510 may be an open-ended tubular body or a split tubular body (i.e. a tubular body having an open end or slot, an example of which is shown in broken lines and indicated with reference numerals 522), to facilitate lateral insertion of the electrical power strip into the channel 510. The tubular body may further include or provide the aforementioned hinge or pivotable connection. The rotation axis 508 may extend through the channel 510 such that the first and second segments 504 and 506 rotate about the electrical power strip, providing a compact solution. As further shown, an underside of the first and second segments 504 and 506 may be provided with a non-slip material, texture, finish or other non-slip surface 512 allowing to increase friction with the roof or surface and further stabilize the illuminating decorative device.

As further shown in FIG. 7, contrary to the clamps described in previous embodiments, the clamp 502 of the present embodiment does not include rearward-facing curvatures, and instead is configured to rest on the shingles 204 or other upper surface of the roof 200 without extending around and under the shingles 204 or other surface. Furthermore, in order to facilitate connecting the clamp extender (e.g., clamp extender 128), the first and second segments 504 and 506 of the clamp 502 may be provided with a distally-, outwardly-, or radially-outward-facing opening 514 configured to receive a proximal, first end of the clamp extender (e.g., first end 146). The opening 514 may be a blind or through hole formed in a protrusion 518 which extends upward from a top surface 516 of the first and second segments 502 and 504. The opening 514 may be arranged opposite to the non-slip surface 510, to further stabilize the connection between the first end of the clamp extender and the opening.

Figure 8:
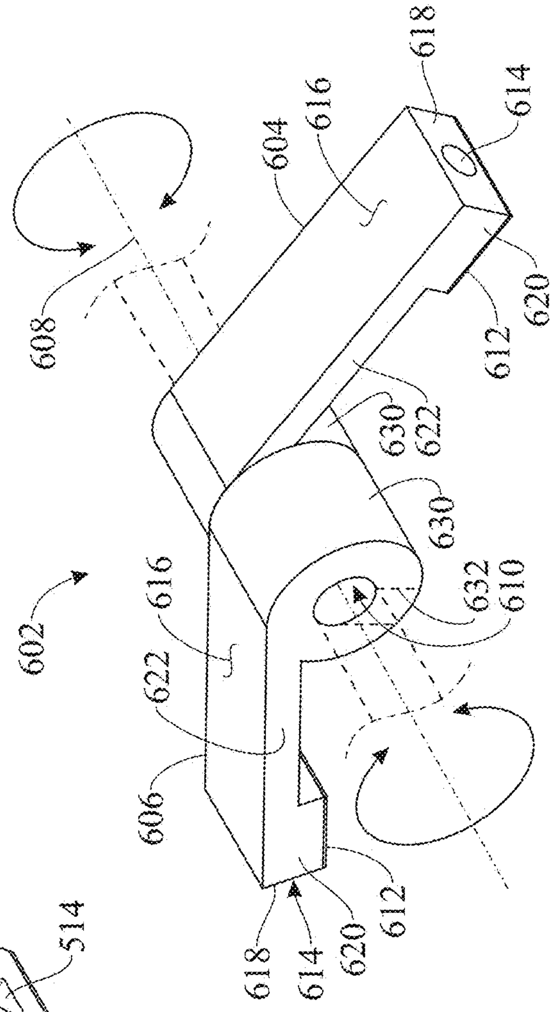
FIG. 8 presents an isometric view of a further alternative embodiment of a clamp configured to secure the illuminating decorative device at a roof ridge.
Figure 9:
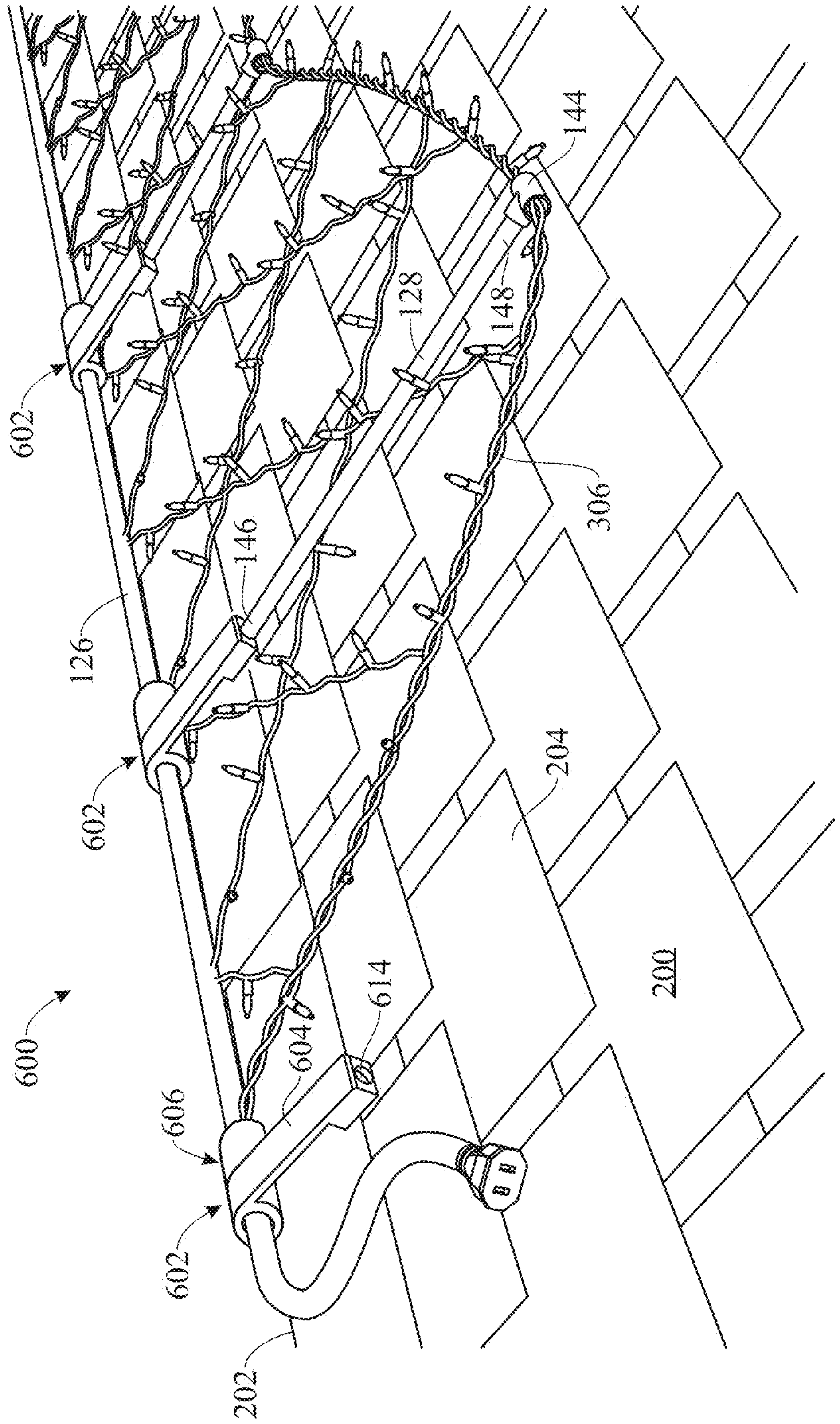
FIG. 9 presents a partial, top view of a roof of a building, showing a portion of the illuminating decorative device installed on the roof with the clamp embodiment of FIG. 8, and clamp extenders, and configured into the shape of snow caps.

The illustrations of FIGS. 8 and 9 show a further embodiment of the invention, and more specifically, an illuminating decorative device 600 having a clamp 602 provided with a first segment 604 and a second segment 606 pivotably connected to one another about rotation axis 608 such that the angle formed by the first and second segments 604 and

608 is adjustable. The first and second segments 604 and 606 may be connected to each other by a hinge or other pivotable connection. Similarly to clamps 126, 146 and 502 described heretofore, a central portion 630 of the clamp 602 (i.e. a respective proximal portion of each segment 604 and 606) may be formed as a closed tubular body, which may include a through channel 610 for allowing the passage therethrough of an electrical power strip of the illuminating decorative device, similarly to channel 510 described heretofore. In other embodiments, the central portion 630 defining the channel 610 may be an open-ended tubular body or a split tubular body (i.e. a tubular body having an open end or slot, an example of which is shown in broken lines and indicated with reference numerals 632), to facilitate lateral insertion of the electrical power strip into the channel 610. The tubular body may further include or provide the aforementioned hinge or pivotable connection. The rotation axis 608 may extend through the channel 610 such that the first and second segments 604 and 606 rotate about the electrical power strip, providing a compact solution. As further shown, an underside of the first and second segments 604 and 606 may be provided with a non-slip material, texture, finish or other non-slip surface 612 allowing to increase friction with the roof or surface and further stabilize the illuminating decorative device. Similarly to the embodiment of FIGS. 7 and 9, the clamp 602 of the present embodiment does not include rearward-facing curvatures, and instead is configured to rest on the shingles 204 or other upper surface of the roof without extending around and under the shingles 204 or other surface. Furthermore, in order to facilitate connecting the clamp extender (e.g., clamp extender 128), the first and second segments 604 and 606 of the clamp 602 may be provided with a distally-, outwardly-, or radially-outward-facing opening 614 configured to receive a proximal, first end of the clamp extender (e.g., first end 146). The opening 614 may be formed at a distally-facing end side 618 of the first and second segments 602 and 604. In some embodiments, such as the present embodiment, an end portion 620 of the first and second segments 602 and 604 may be thicker than a central portion 622 of the first and second segments 602 and 604, and the opening may be a blind or through opening formed in the thicker end portion 620. Similarly to the previous embodiment, the opening 614 may be arranged opposite to the non-slip surface 612, to further stabilize the connection between the first end of the clamp extender and the opening.

Figure 10:
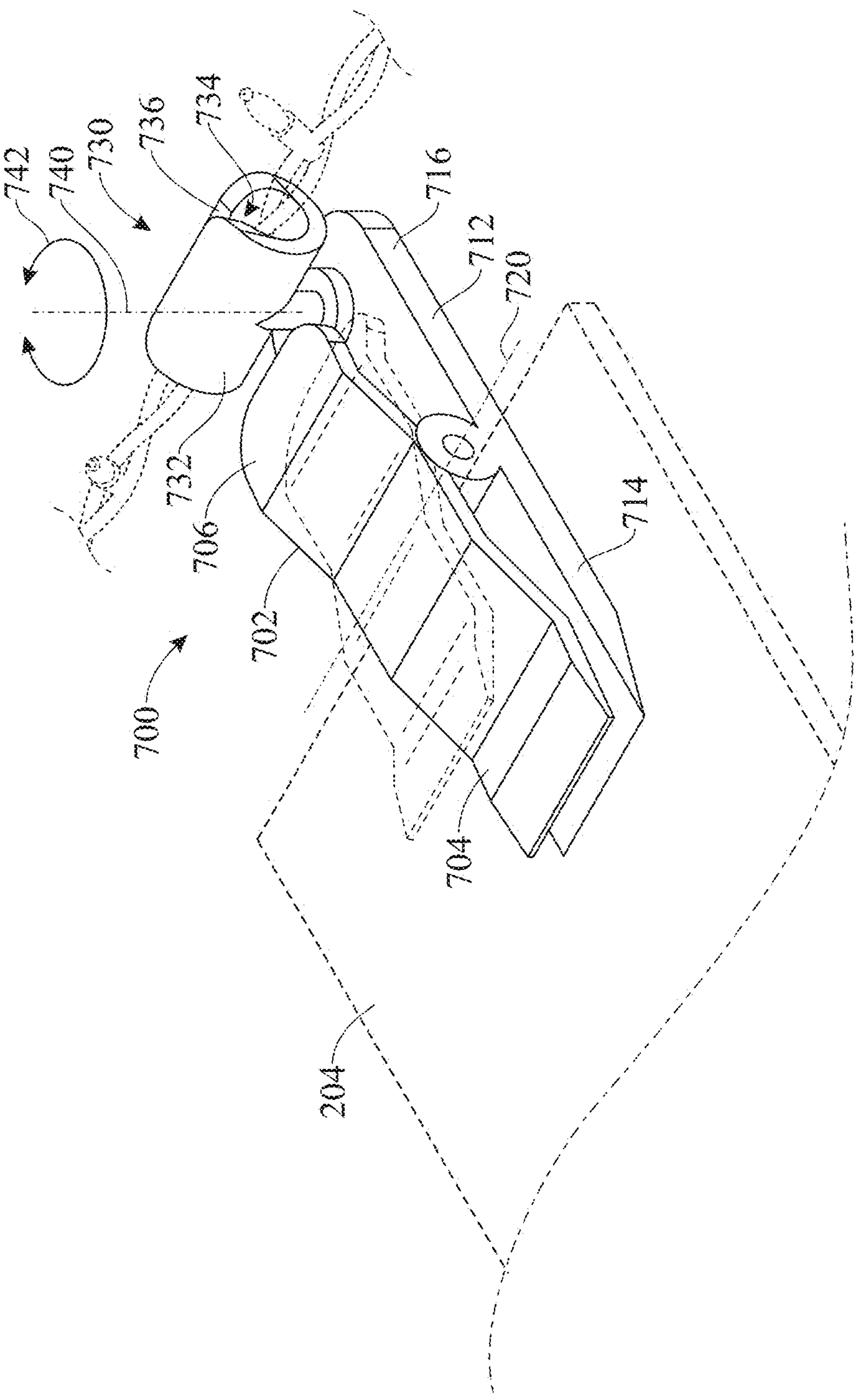
FIG. 10 presents a top isometric view of a further clamp in accordance with another embodiment of the invention, said further clamp shown releasably clamping a roof shingle and releasably securing a wire of the illuminating decorative device, to further stabilize the device on the roof.

To further secure any embodiment of the illuminative decorative device of the invention to the roof or other surface, the illuminative decorative device may further include a preferably spring-loaded, clamp device 700, shown in FIG. 10. The clamp device 700 is configured to clamp or attach to a roof shingle 204 or other similar structure having a relatively thin and optionally flat edge. The clamp device 700 may include a first clamp member 702 and a second clamp member 712 pivotably connected to one another about a rotation axis 720. The first clamp member 702 may include a first end portion 704 and a second end portion 706, extending in different directions (preferably generally opposed to one another) from the rotation axis 720. Similarly, the second clamp member 712 may include a first end portion 714 and a second end portion 716, extending in different directions (preferably generally opposed to one another) from the rotation axis 720. The first end portions 704 and 714 are arranged facing one another, similarly to the second end portions 706 and 716. The clamp device 700 is preferably spring-loaded towards a closed position in which the first end portions 704 and 714 are pivoted towards one another to clamp a shingle 204 or other structure therebetween. In turn, a user may press the second end portions 706 and 716 towards one another, to overcome the spring-bias and cause the first end portions 702 and 712 to pivot away from one another to an open position, to remove the clamp device 700 from, or attach the device to a shingle 204 or other structure.

As further shown in FIG. 10, the clamp device 700 may comprise a wire receiver 730 configured to secure a portion or segment of one or more wires of the illuminative decorative device to further immobilize the wires on the roof or structure. The wire receiver 730 may be shaped, for instance, as a hollow, split tube 732 having an internal space 734 and a slot 736 providing the wire receiver 730 with a generally C-shaped cross section. As shown, a wire may be fit into the internal space 734 of the wire receiver 730 through the slot 736. The wire receiver 730 may be carried by one of the first and second clamp members 702 and 712. For instance, in the present embodiment, the wire receiver 730 is carried by or attached to the second clamp member 712, i.e. to the clamp member having a generally flat shape configured to stably rest on the roof as the other clamp member (i.e. first clamp member 702) is pivoted relatively thereto. In some embodiments, as shown, the wire receiver 730 may be rotatably attached to the clamp member (e.g., to the second clamp member 712) about a wire receiver rotation axis 740, the wire receiver 730 rotatable about the wire receiver rotation axis 740 as indicated by arrow 742, to allow the wire to self-adjust to the correct orientation as the device is installed, and also to enable the clamp device 700 to be secured in any position or orientation along the roof or structure.

Figure 11:
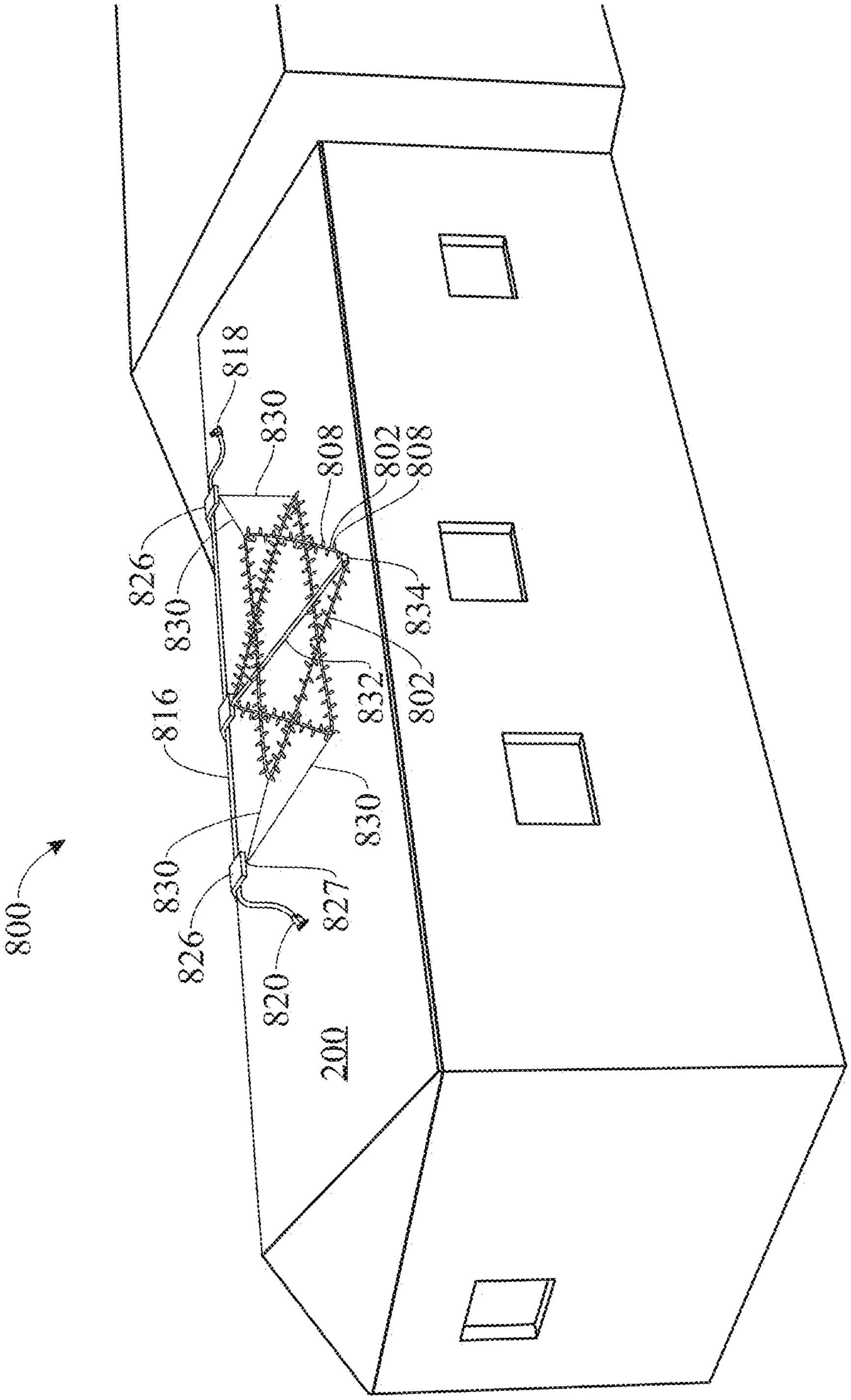
FIG. 11 presents a perspective view of a building, showing an illuminating decorative device including a plurality of electrical wires interconnected to form a lattice or web of electrical wires including a plurality of lights that are electrically coupled to an electrical strip including a male and female electrical connector, where the illuminating decorative device is configured in the ornamental shape of Star of David, in accordance with another embodiment of the present invention.

With reference to FIG. 11, an illuminating decorative device 800 is shown in accordance with a further embodiment of the invention. The illuminating decorative device 800 comprises an electrical power strip 816 ending in first and second electrical connectors 818 and 820, and a set of wires 802 in electrical communication with the electrical power strip 816 and the connectors 818 and 820. The wires 802 are in electrical communication with each other and comprise a plurality of lights 808. The wires 802 and lights 808 are arranged forming the Star of David. Similarly to previous embodiments, the electrical power strip 816 is secured to a sequence of top clamps 826, which also secure the illuminating decorative device 800 to the roof. The clamps 826 may be provided with one or more hooks or fasteners allowing to attach a cord, rope, chain, band, strap or other elongated connector or link 830 configured to further anchor the set of wires 802 to the clamps 826 and prevent movement of the set of wires 802 on the roof. Furthermore, one or more clamp extenders 832 and corresponding distal connectors (e.g., T-connectors 834) may be connected to and extend between the clamps 826 and the wires 802 to further maintain specific points of the wires 802 in adequate locations along the roof. For example, a clamp extender 832 may connect to and extend from a clamp 826, and a T-connector 834 at the distal end of the clamp extender 832 may be secured to a wire 802 at distal tip of the Star of David such that the clamp extender 832 maintains the distal tip at a fixed position relative to the clamp 826. Though not shown, an opposite side of the roof may be provided with a similar Star of David wire arrangement, or a different wire arrangement also in electrical connection to the electrical power strip 816 and connectors 818 and 820.

Figure 12:
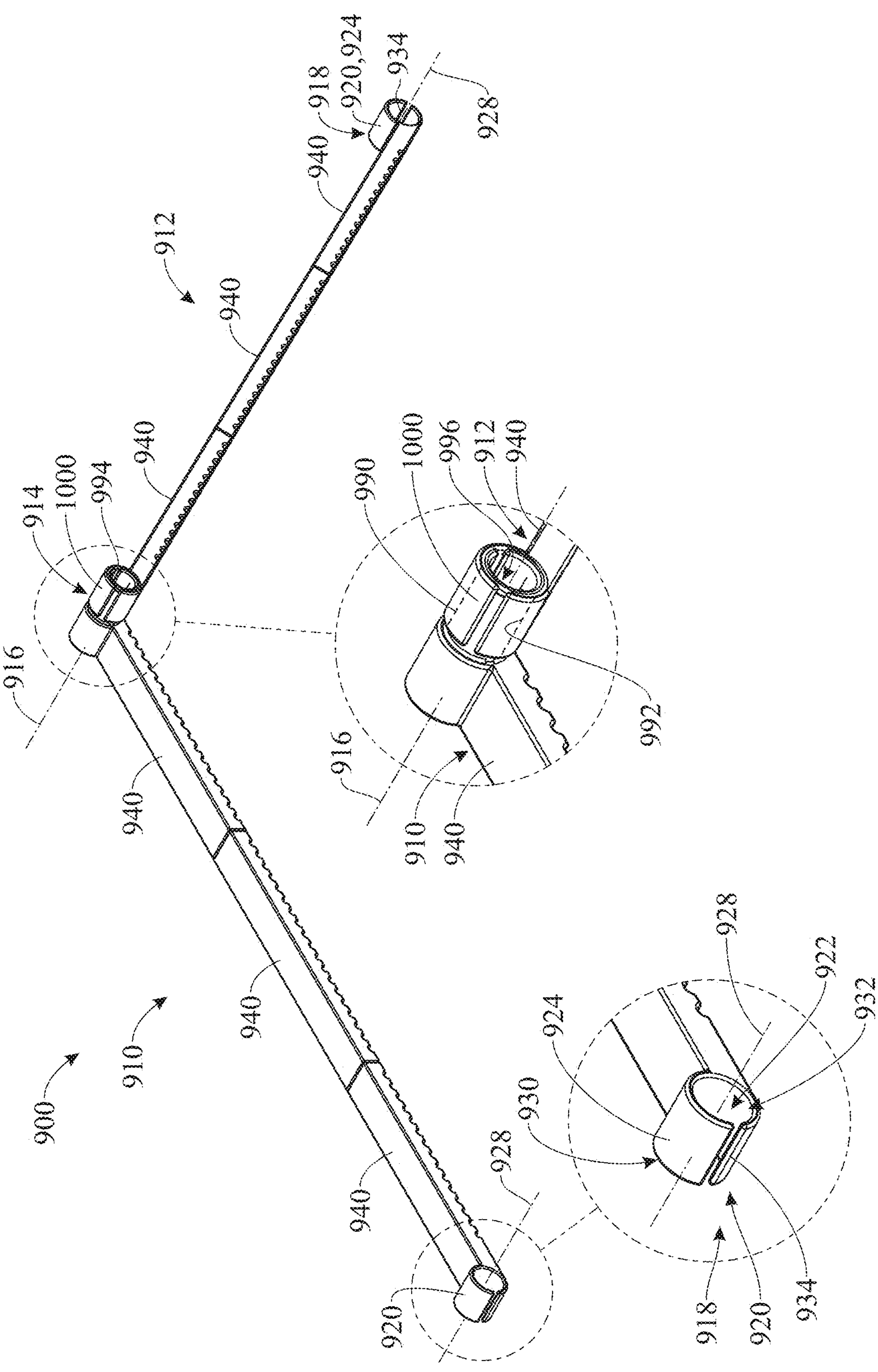
FIG. 12 presents a top isometric view of a clamp device in accordance with a further embodiment of the present invention, the clamp device including length-adjustable first and second members, the first and second members shown arranged in a fully retracted configuration.

The illustrations of FIGS. 12-17 show yet another clamp, hereinafter referred to as clamp device 900, in accordance with an embodiment of the present invention. The clamp device 900 may be similarly used to support an illuminating decorative device, such as illuminating decorative device 100 shown in FIG. 1. With reference initially to FIG. 12, similarly to previous embodiments disclosed herein, the clamp device 900 of the present embodiment includes a first member 910 and a second member 912. A hinge 914 pivotably connects the first and second members 910 and 912 to one another about a pivot axis 916. Also similarly to previous embodiments, the clamp device 900 further includes at least one wire receiver 920 carried by at least one of the first member 910 and the second member 912; for instance, the clamp device 900 specifically depicted herein includes a pair of wire receivers 920, wherein each one of the first and second members 910 and 912 carries a respective wire receiver 920 of the pair of wire receivers. As in previous embodiments, each wire receiver 920 may include or define an internal space or through bore 922 configured to receive at least one wire (e.g., wire 102, 104, 106 shown in FIG. 1) or other similar structure of the illuminating decorative device therethrough, in order to suspend the illuminating decorative device from a rooftop or other elevated structure.

As shown in FIG. 12, each wire receiver 920 includes a main body or sidewall 924. The sidewall 924 may define the through bore 922. The through bore 922 may be formed along an axial direction 928, and may extend from a first open end 930 of the wire receiver 920 to an opposite, second open end 932 of the wire receiver 920. For instance and without limitation, the sidewall 924 may be generally cylindrical about the axial direction 928, as shown. In some embodiments, the through bore 922 may be elongately formed along the axial direction 928; for instance, in the present embodiment, the through bore 922 and the cylindrical sidewall 924 are elongately formed along the axial direction 928, i.e. the inner diameter of the sidewall 924 (or diameter of the through bore 922) is less than the length of the through bore 922 along the axial direction 928. The elongated through bore 922 and sidewall 924 may facilitate stabilizing a wire along the through bore 922 to better maintain the wire arranged in the axial direction 928 of the through bore 922. In preferred embodiments, such as the present embodiment, the axial direction 928 is parallel to the pivot axis 916.

As further shown in FIG. 12, the wire receiver 920 may additionally include a slot 934 extending through the sidewall 924 from the first open end 930 to the second open end 932, and thus in spatial communication with said open ends 930, 932. The slot 934 may be arranged in spatial communication with the through bore 922. Insertion of a wire into the through bore 922 may be carried out in an expedited and convenient manner by shifting the wire through the slot 934, and subsequently through the first and second open ends 930 and 932 and into the through bore 922, to position the wire extending along the through bore 922 and axially outward of the sidewall 924 through the first and second open ends 930 and 932.

As further shown in FIG. 12, the first and second members 910 and 912 may form a V-shaped arrangement, similarly to prior embodiments (e.g., FIGS. 7-8). The angle formed by the first and second members 910 and 912 is adjustable by pivoting the first and second members 910 and 912 relative to one another about the pivot axis 916. The V-shaped arrangement facilitates stably resting and supporting the clamp device 900 on an angled roof ridge. In some embodiments, the angle may be further adjusted to about 180 degrees, to position the first and second members 910 and 912 generally coplanar with one another thereby facilitating installing the clap device 900 on a flat roof or structure.

The first member 910 may be length-adjustable to vary a distance between the pivot axis 916 and the wire receiver 920 which is carried by the first member 910. Alternatively or additionally, the second member 912 may be length-adjustable to vary a distance between the pivot axis 916 and the wire receiver 920 which is carried by the second member 912. In a non-limiting embodiment, the length-adjustable first and/or second member 910, 912 is telescopically length-adjustable between an extended configuration and a retracted configuration. For instance, in the present embodiment, both the first member 910 and the second member 912 are length-adjustable. Each one of the first and second members 910 and 912 may be independently length-adjusted between a fully extended position, shown in FIG. 15, and a fully retracted position, shown in FIG. 12. In preferred embodiments, each one of the first and second members 910 and 912 is further independently length-adjustable to a plurality of intermediate lengths; for instance, the first and second members 910 and 912 depicted herein include are adjustable to, and may be retained at, a plurality of discrete, intermediate lengths.

Figure 13:
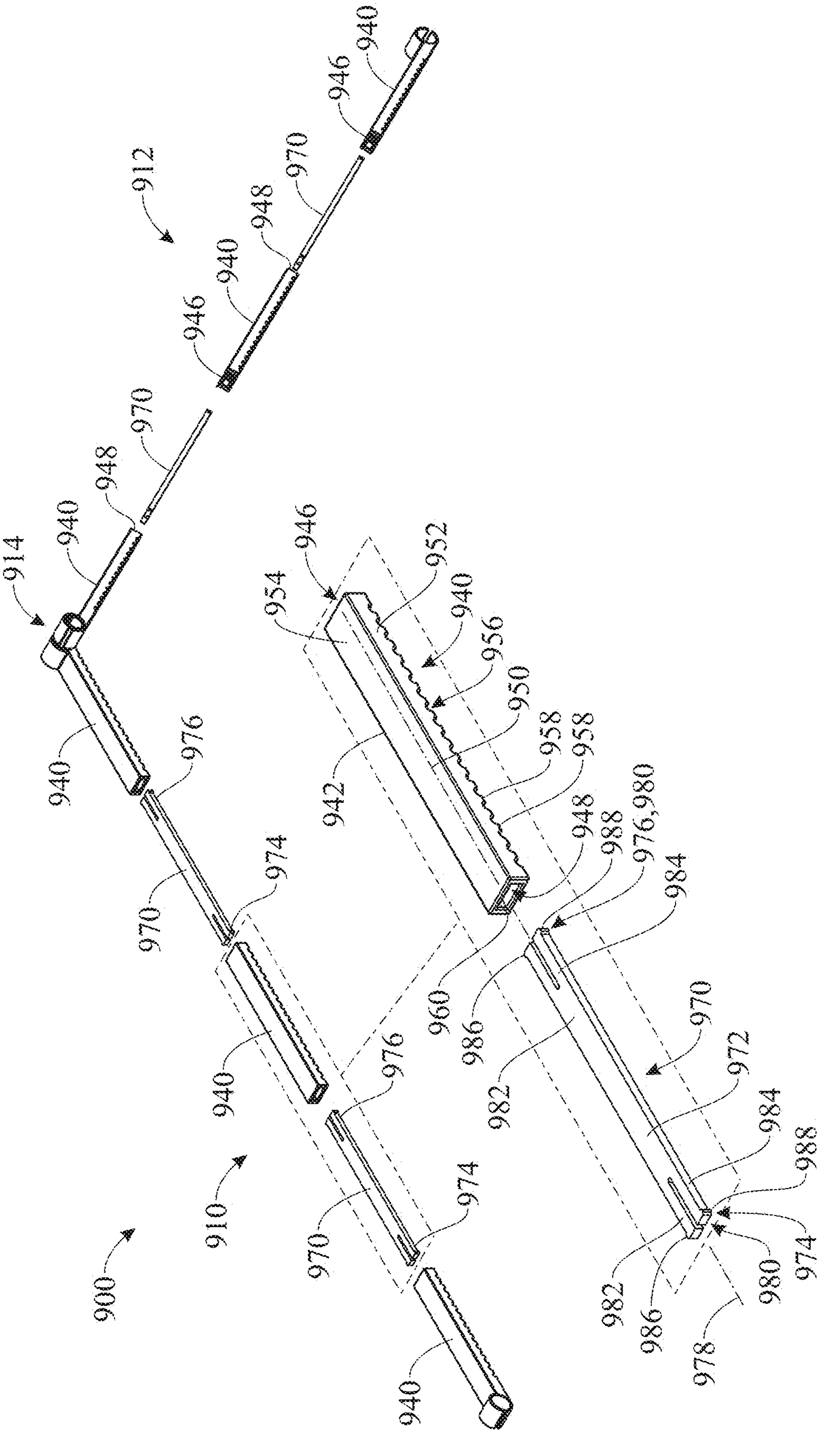
FIG. 13 presents an exploded, top isometric view of the clamp device of FIG. 12.
Figure 14:
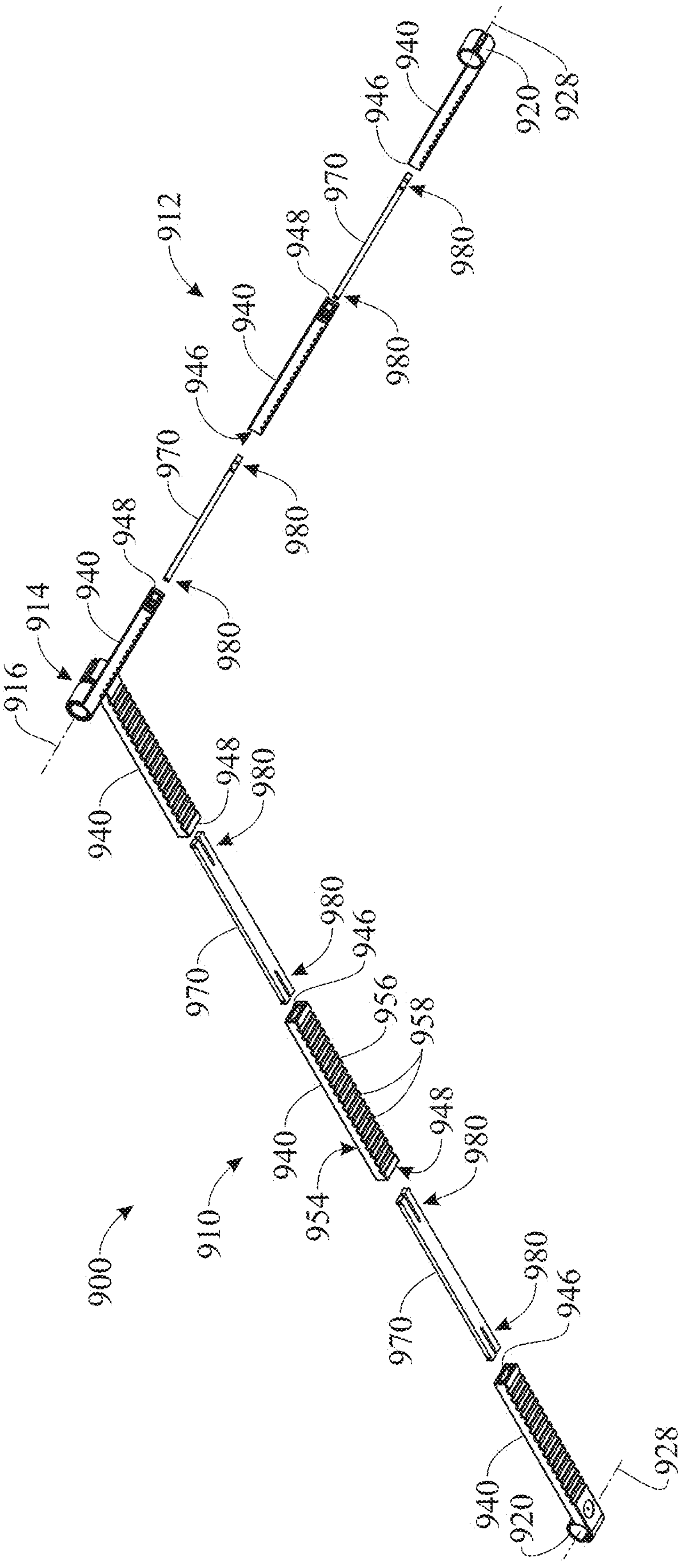
FIG. 14 presents an exploded, bottom isometric view of the clamp device of FIG. 12.

The first and second members 910 and 912 of the present embodiment are constructed generally the same; for clarity purposes, the first member 910 is described in detail hereinafter; unless expressly indicated otherwise, the same description applies to the second member 912. Turning to FIGS. 13 and 14, the first member 910 may include one or more female segments 940 and one or more male segments 970, the male and female segments 940 and 970 arranged longitudinally alternate. For instance, the depicted first member 910 specifically includes three female segments 940 and two male segments 970. Each male segment 970 may be adjustably insertable into an adjacent female segment 940 to telescopically vary the length of the first member 910, i.e. to vary the distance between the wire receiver 920 of the first member 910 and the hinge 914.

In some embodiments, the end segments which are arranged at opposite ends of the first member 910 may be female segments 940; for instance, in the present embodiment, the hinge 914 is provided, or formed, at a proximal one of the three female segments 940, and the wire receiver 920 is provided, or formed, at a distal one of the three female segments 940. In such embodiments, each male segment 970 may telescopically interface with a pair of opposing, female segments 940. Opposite first and second ends 974 and 976, respectively, of each male segment 970 may be adjustably insertable into a pair of opposite, adjacent female segments 940, respectively, to telescopically vary the length of the first member 910.

As further shown in FIGS. 13 and 14, each female segment 940 may include an elongated, main body 942, preferably integrally-formed into a single-piece unit, such as made of hard plastic. The main body 942 may define at least one interior space 944 (FIG. 17) which extends into the main body 942 from a proximal end opening 946 and/or from an opposite, distal end opening 948. In preferred embodiments, the main body 942 may be generally straight along a longitudinal direction 950 of the main body 942 which defines a longitudinal direction of the first member 910. The female segment 940 may include an outer side 952, including a top side or surface 954 and an opposite, underside or bottom surface 956. In turn, an inner wall 960, opposite the outer side 952, may define the interior space 944. In preferred embodiments, the top and bottom surfaces 954 and 956 may be generally parallel to one another, and more preferably flat and formed on respective planes which are arranged generally parallel to the pivot axis 916. In some embodiments, the generally flat bottom surface 956 may include a non-slip texture or other non-slip feature; for example, the bottom surface 956 of the present embodiment includes small, transverse ridges 958.

Figure 16:
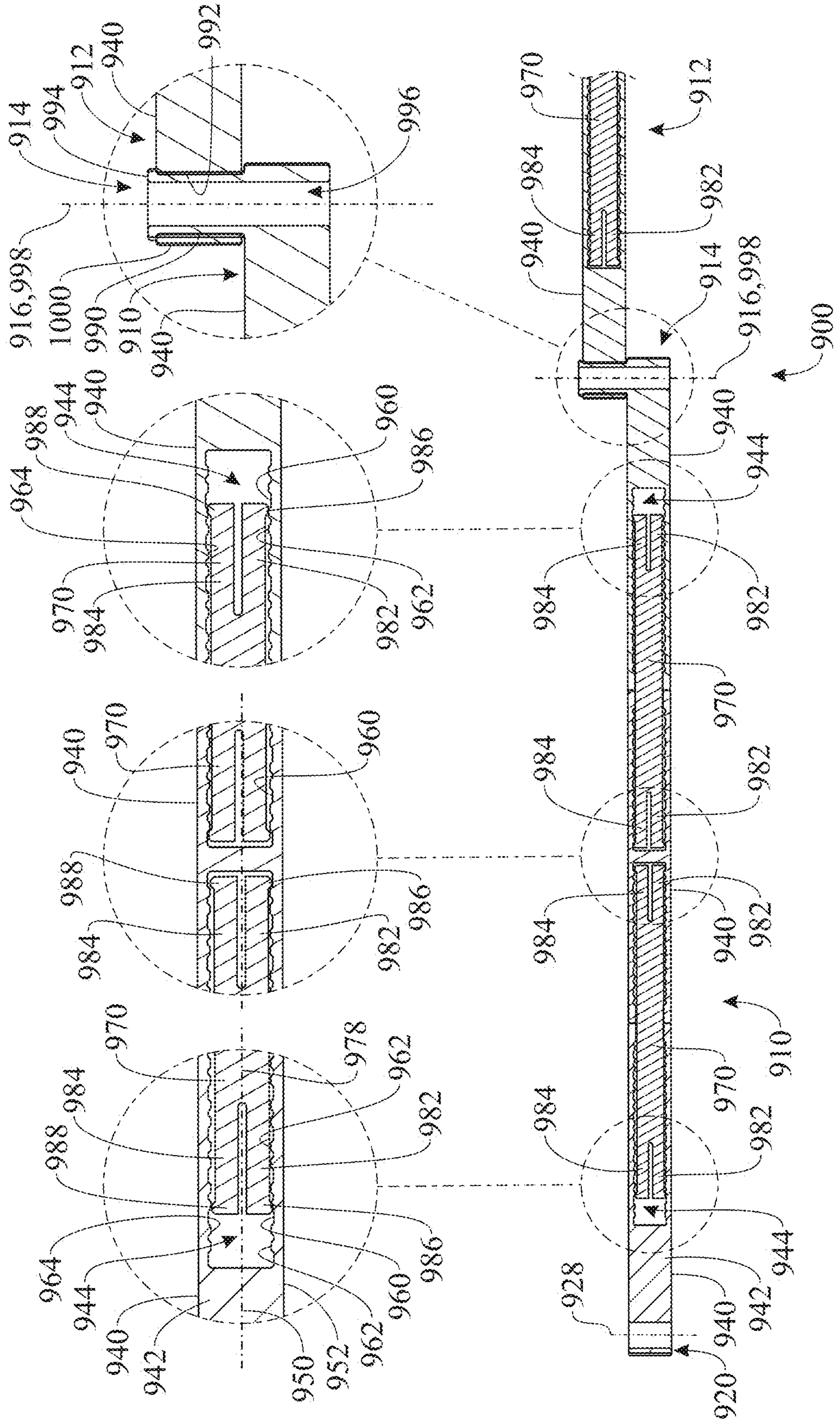
FIG. 16 presents a cross-sectional bottom plan view of the clamp device in the fully retracted configuration of FIG. 12.
Figure 17:
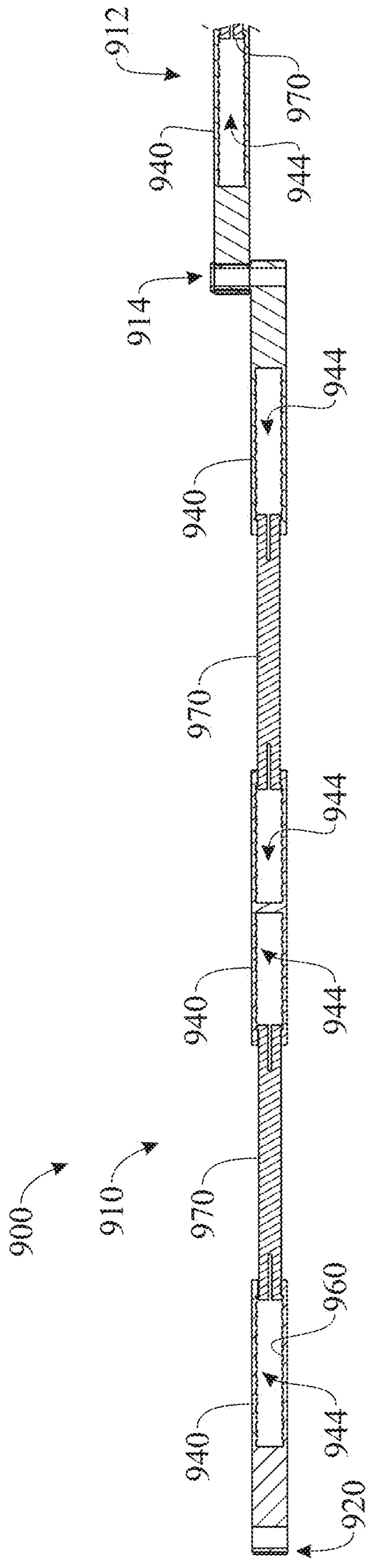
FIG. 17 presents a cross-sectional bottom plan view of the clamp device in the fully extended configuration of FIG. 15.

As best shown in FIGS. 16 and 17, each female segment 940 includes a plurality of longitudinally-spaced-apart protrusions 962, 964, which may be formed in the inner wall 960 and protrude into the at least one interior space 944. In preferred embodiments, the plurality of longitudinally-spaced-apart protrusions 962, 964 may include a first plurality of longitudinally-spaced-apart protrusions 962 and a second plurality of longitudinally-spaced-apart protrusions 964 formed on opposite areas of the inner wall 960.

Referring again to FIGS. 13 and 14, each male segment 970 may include an elongated, main body 972 ending in the aforementioned opposite, first and second ends 974 and 976. The main body 972 may be formed into a single-piece unit, made for instance of hard plastic. The main body 972 may be generally straight and formed along a longitudinal direction 978 which is parallel to the longitudinal direction 950 of the female segment 940. In some embodiments, the main body 972 may be formed as a relatively thin, elongated plate, as shown.

As best shown in FIG. 13, each one of the first end 974 and the second end 976 of the male segment 970 may include a respective, elastically-deformable protruding portion 980 configured to releasably lock with the plurality of longitudinally-spaced-apart protrusions 962, 964 of an adjacent female segment 940. In some embodiments, such as the present embodiment, the elastically-deformable protruding portion 980 may include an elastically-deformable, first arm 982 and an elastically-deformable, second arm 984; the first and second arms 982 and 984 may be flexed towards one another and are elastically biased towards an unflexed position. The first and second arms 982 and 984 may end in respective free ends 986 and 988. The free ends 986 and 988 of the first and second arms 982 and 984 may be configured to releasably lock with the plurality of protrusions 962, 964 of the adjacent female segment 940. More specifically, the free end 986 of the first arm 982 may releasably engage with the plurality of protrusions 962 and the opposing, free end 988 of the second arm 984 may releasably engage with the opposing, plurality of protrusions 964 within the same adjacent female segment 940.

As noted hereinabove, in some embodiments, the hinge 914 may be provided at, or by, respective proximal female segments 940 of the first and second members 910 and 912. As best shown in FIGS. 12 and 16, the proximal female segment 940 of the first member 910 may include a hollow, cylindrical tubular portion 990 extending transversely from the otherwise elongated proximal female segment 940 of the first member 910. In turn, the proximal female segment 940 of the second member 912 may include a through bore 992 extending transversely therethrough. The through bore 992 may rotationally receive the tubular portion 990 about the pivot axis 916, allowing the proximal female segment 940 of the first member 910 to rotate with respect to the proximal female segment 940 of the second member 912 about the pivot axis 916. In some embodiments, the tubular portion 990 and the through bore 992 may be elastically-clipped to one another; for example, the proximal end of the proximal female segment 940 of the second member 912 may include an elastically-deformable, split-cylinder sleeve 1000 defining the through bore 992, and the tubular portion 990 may include a wider, end flange 994 configured to axially abut against an outer side of the sleeve 1000 when the sleeve 1000.

As shown in FIG. 16, a through channel 996 may be defined through the hinge 914.

More specifically, the through channel 996 of the present embodiment is formed through the proximal end of the proximal female segment 940 of the first member 910, including the hollow, cylindrical tubular portion 990. The through channel 996 extends along a central longitudinal direction 998 which is parallel to the pivot axis 916, and more preferably, matches the pivot axis 916. Further preferably, the central longitudinal direction 998 and the pivot axis 916 are parallel to the axial direction 928 of the wire receivers 920

In preferred embodiments, the first and second members 910 and 912 are generally rigid. I.e., the first and second members 910 and 912 may be made of one or more rigid materials such as hard plastic and are undeformable under normal operating conditions of the camping device 100 aside from the elastic properties heretofore described.

In an illustrative method of operation of the clamp device 900, the clamp device 900 may be initially assembled by mounting the male and female segments 940 and 970 of the first and second members 910 and 912 as heretofore described. For example, the proximal female segments 940 of the first and second members 910 and 912 may be coupled to form the hinge 914, by inserting the tubular portion 990 of the proximal female segment 940 of the first member 910 into the through bore 992 of the elastically openable, split cylinder sleeve 1000 of the proximal female segment 940 of the second member 912. This insertion may be facilitated by the end flange 994 of the tubular portion 990 having a shape (e.g., rounded edges) configured to convert an axial pushing force on the tubular portion 990 into a transverse (radial) force which sufficiently opens the sleeve 1000 to allow the tubular portion 990 to pass through.

Distally of the hinge 914, the male and female segments 940 and 970 of each of the first and second members 910, 912 may be connected to one another to form the first and second members 910 and 912. Insertion of the first and second ends 974, 976 of each male segment 970 into the respective openings 946, 948 of the adjacent female segments 940 may be facilitated by the free ends 986, 988 of first and second arms 982, 984 having a shape (e.g., rounded edges) configured to convert a longitudinal pushing force on the male segment 970 into a transverse force which pushes the arms 982, 984 towards one another to allow the corresponding end 974, 976 to pass through the opening 946, 948 of the female segment 940.

Once the male segments 970 have been connected to the female segments 940, the user may adjust the extent to which the male segments 970 are inserted within the female segments 940 to telescopically adjust the length of the first and second members 910 and 912. When adjusting the degree of insertion, the elastically-deformable protruding portions 980 (arms 982 and 984) of the male segments 970 are sufficiently elastically biased outward to be retained or stopped at each protrusion 962, 964, optionally producing a clicking sound when engaging the protrusion 962, 964; such engagement allows the protrusions 962, 964 to retain the first and second members 910 and 912 at the selected length, and to further retain the male segment 970 within the female segment 940. This outward bias of the elastically-deformable protruding portions 980 (arms 982 and 984), however, may be overcome by a relatively strong manual force being exerted longitudinally on the male segment 740 relative to the female segment 940 to cause an inward flexing of the elastically-deformable protruding portion 980 (arms 982 and 984) which frees the elastically-deformable protruding portion 980 from the protrusions 962, 964 and enables an axial displacement of the male segment 970 within the female segment 940, and preferably also enables removing the male segment 970 from the female segment 940 for storage or transportation purposes.

Figure 15:
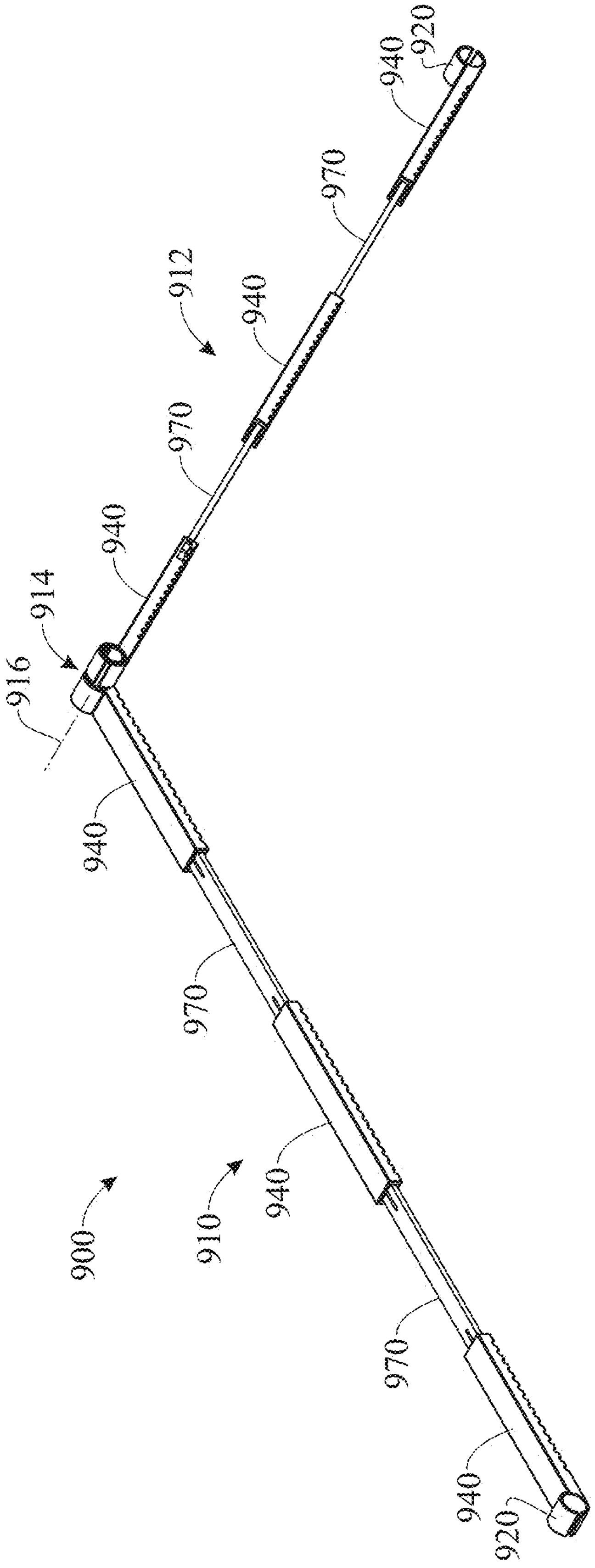
FIG. 15 presents a top isometric view of the clamp device of FIG. 12 with the first and second members shown in a fully extended configuration.

The illustrations of FIGS. 15 and 17 show the clamp device 900 with the first and second members 910 and 912 fully extended. In turn, the illustrations of FIGS. 12 and 16 show the clamp device 900 with the first and second members 910 and 912 fully retracted. In the fully retracted configuration, as shown for instance in FIG. 12, the male segments 970 are entirely received within the female segments 940, and the female segments 940 are arranged in back-to-back continuation with one another.

As noted hereinabove, the number of male and female segments 940 and 970 may vary without departing from the scope of the present disclosure. Furthermore, the user may choose the number of male and female segments 940 and 970 to be mounted to one another, to further customize the size of the clamp device 900. For example, the clamp device 900 may be initially provided as a kit comprising a set of male and female segments 940 and 970; the user may mount a selected number of male and female segments 940 and 970, depending on the dimensions of the roof ridge and/or illuminating decorative device to be supported by the clamp device 900. Once the user has mounted the selected male and female segments 940 and 970, the user may fine-tune the size of the clamp device 900 by telescopically adjusting the length of the first and second members 910 and 912.

If needed, the user may disconnect each male segment 970 from the adjacent female segment 940 by applying a sufficiently high longitudinal force on the male segment 970 or female segment 940 to overcome the elastically-biased engagement between the elastically-deformable protruding portion 980 of the male segment 970 and the protrusions 962, 964 of the female segment 940. The user may thereby reduce the number of male and female members 940 and 970 comprised in the clamp device 900, or to disassemble the clamp device 900 if desired. The user may further choose to disassemble the hinge 914 by pulling the tubular portion 990 out of the through bore 992. The male and female segments 940 and 970 being detachable from one another may facilitate cleaning, maintenance, storage, and transportation of the clamp device 900. Furthermore, in some embodiments, the first and second members 910 and 912 may be pivoted about the hinge 914 to form a 0-degree angle with respect to one another, further facilitating storage and transportation, most particularly when the first and second members 910 and 912 are additionally arranged in the retracted configuration.

Figure 18:
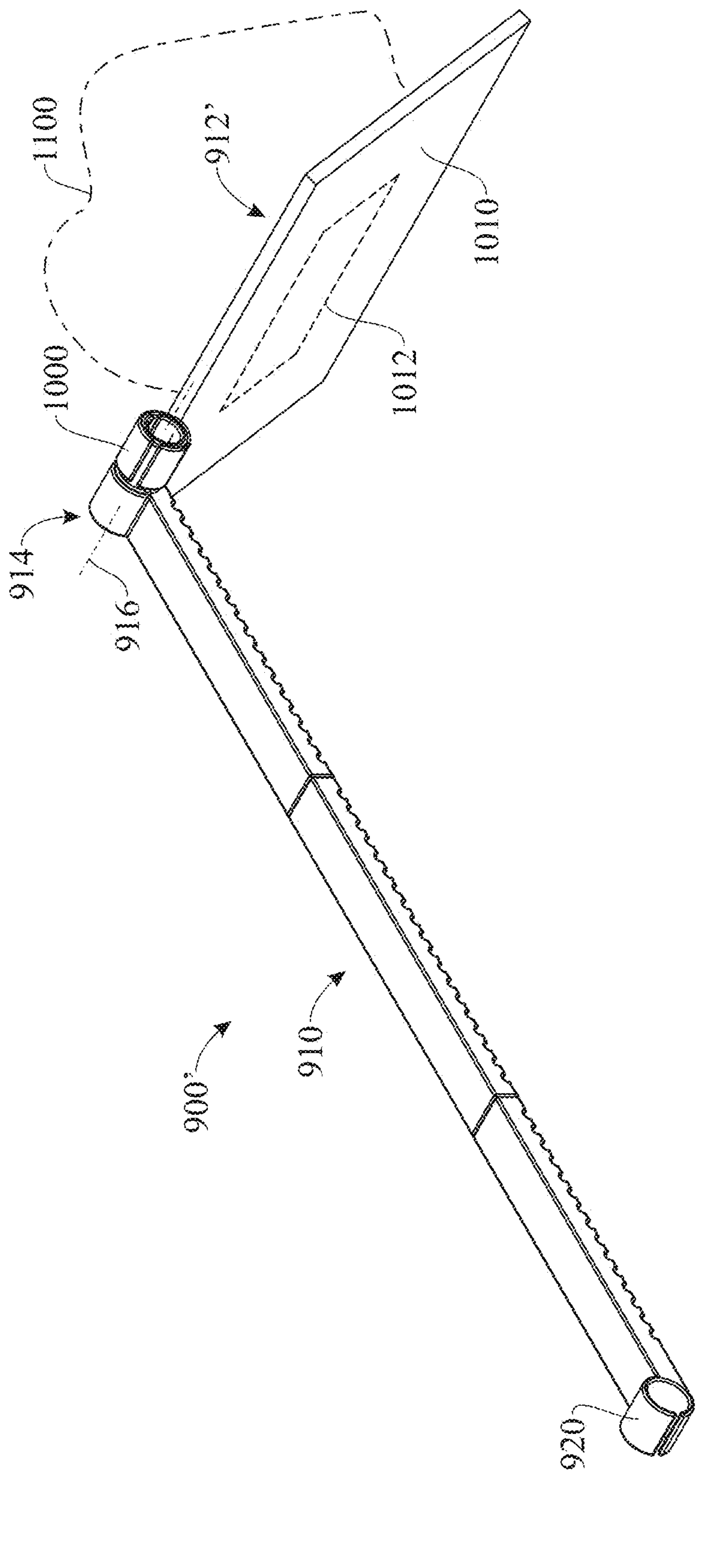
FIG. 18 presents a top isometric view of a clamp device in accordance with a further embodiment of the present invention, the clamp device including a single length-adjustable first members and a flat second member.

The illustration of FIG. 18 shows a clamp device 900' in accordance with a further embodiment of the present invention. The clamp device 900' is similar to the clamp device 900 of FIGS. 12-18, with the exception that clamp device 900' comprises a single, length-adjustable member (first member 910) a non-length-adjustable, second member (indicated by reference numeral 912') shaped generally as a flat panel. For instance, the second member 912' specifically depicted herein consists essentially of a flat, main body 1010. Similarly to the previous embodiment, the second member 912' of the present embodiment is pivotably attached to the first member 910 by the hinge 914. Also similarly to the previous embodiment, the second member 912' includes the split cylinder sleeve 1000 which cooperates with the first member 910 to form the hinge 914.

As further shown, in some embodiments, the second member 912' may be weighted, allowing to further stabilize the clamp device 900' on a roof ridge or other structure. For instance and without limitation, a weight 1012 may be attached to, or more preferably embedded within, the second member 912'. Alternatively or additionally, the generally flat, second member 912' may facilitate placing a sandbag 1100 or other weight thereon, which may further contribute to stabilize the clamp device 900' on the roof ridge or other structure.

As previously noted, in a preferred application of the present invention, the clamp devices disclosed herein may be used to support an illuminating decorative device on a rooftop or other angled or non-angled structure. However, the clamp devices may be further used to support or suspend any other applicable object or device from a rooftop or other applicable structure. Furthermore, the illuminating decorative devices usable with the clamp devices may or may not include a central power strip and/or power connectors. Additionally, the number and location of the power connectors (if any) within the illuminating decorative device may vary.

The illuminating decorative devices as per the invention provide various ornamental configurations including snowcaps, a spider web, the Star of David, as shown herein. It is understood that other configurations may be provided to accommodate joyful occasions of holidays, and festive occasions. For instance, illumination decorative devices can be configured to mimic or be configured in various ornamental shapes including any of a reindeer, a snowman, a sleigh, a tree, a ghost, a human skeleton, an animal, a pumpkin, and a heart (e.g., for Valentine's Day), a basket or egg (e.g., for Easter), or a flag (e.g., an American flag for Independence Day).

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A clamp device, comprising:

a first member;

a second member;

a hinge, pivotably connecting the first and second members about a pivot axis;

at least one wire receiver carried by at least one of the first member and the second member, the at least one wire receiver comprising an internal space configured to receive at least one wire therethrough; wherein said at least one of the first member and the second member is length-adjustable to vary a distance between the wire receiver and the pivot axis, wherein said at least one of the first member and the second member is telescopically length-adjustable between an extended configuration and a retracted configuration:

wherein said at least one of the first member and the second member comprises one or more male segments and one or more female segments, the male and female segments arranged longitudinally alternate, wherein opposite first and second ends of each male segment of the one or more male segments are adjustably insertable into a pair of opposite, adjacent female segments of the one or more female segments, respectively, to telescopically vary a length of said at least one of the first member and the second member; and wherein each one of said first and second ends of said each male segment is retainable at two or more different overlapping lengths with respect to a respective adjacent female segment of said pair of opposite, adjacent female segments by respective, two or more stops.

2. The clamp device of claim 1, wherein said first and second members are arranged forming a V-shaped arrangement, wherein an angle formed by the first and second members is adjustable by pivoting said first and second members relative to one another about the pivot axis.

3. The clamp device of claim 1, wherein said respective adjacent female segment comprises a plurality of longitudinally-spaced-apart protrusions, and said each one of said first and second ends of said each male segment comprises an elastically-deformable protruding portion configured to releasably lock with each protrusion of said plurality of longitudinally-spaced-apart protrusions.

4. The clamp device of claim 3, wherein said plurality of longitudinally-spaced-apart protrusions comprises a first set of longitudinally-spaced-apart protrusions arranged on a first side of said respective adjacent female segment and a second set of longitudinally-spaced-apart protrusions arranged on a second side of said respective adjacent female segment opposite the first side, and further wherein said elastically-deformable protruding portion of said each one of said first and second ends of said each male segment comprises elastically-deformable, first and second arms ending in respective, first and second ends, the first and second ends configured to releasably lock with the first and second sets of longitudinally-spaced-apart protrusions, respectively.

5. The clamp device of claim 1, wherein, in the retracted configuration, the one or more male segments are arranged within the one or more female segments, and the one or more female segments are arranged in back-to-back continuation with one another.

6. The clamp device of claim 1, wherein each female segment of the one or more female segments is formed as a hollow body having a top side and an opposite, bottom side, the top and bottom sides arranged generally parallel to the pivot axis.

7. The clamp device of claim 6, wherein at least one of the top and bottom sides is generally flat.

8. The clamp device of claim 1, wherein said at least one of the first member and the second member consists of one of the first member and the second member, and further wherein the other of the first member and the second member comprises a flat panel.

9. The clamp device of claim 1, wherein the hinge comprises a through channel extending along a central longitudinal direction parallel to the pivot axis.

10. The clamp device of claim 9, wherein the central longitudinal direction and the pivot axis are the same.

11. The clamp device of claim 1, wherein an underside of at least one of the first member and the second member comprises a non-slip surface.

12. The clamp device of claim 1, wherein the wire receiver comprises a sidewall defining a through bore extending along an axial direction from a first open end of the wire receiver to an opposite, second open end of the wire receiver, the wire receiver further comprising a slot extending through the sidewall from the first open end to the second open end, the slot arranged in spatial communication with the through bore.

13. The clamp device of claim 12, wherein the through bore is elongately formed along the axial direction.

14. The clamp device of claim 12, wherein the axial direction is parallel to the pivot axis.

15. The clamp device of claim 1, wherein the first and second members are generally rigid.

16. A clamp device, comprising:

a first member;

a second member, arranged forming a V-shaped arrangement with the first member;

a hinge, pivotably connecting the first and second members about a pivot axis, wherein an angle formed by the first and second members is adjustable by pivoting said first and second members relative to one another about the pivot axis;

at least one wire receiver carried by at least one of the first member and the second member, the at least one wire receiver comprising an internal space configured to receive at least one wire therethrough; wherein said at least one of the first member and the second member is telescopically length-adjustable to vary a distance between the wire receiver and the pivot axis;

wherein said at least one of the first member and the second member is telescopically length-adjustable between an extended configuration and a retracted configuration:

wherein said at least one of the first member and the second member comprises one or more male segments and one or more female segments, the male and female segments arranged longitudinally alternate, wherein opposite first and second ends of each male segment of the one or more male segments are adjustably insertable into a pair of opposite, adjacent female segments of the one or more female segments, respectively, to telescopically vary a length of said at least one of the first member and the second member; and wherein each one of said first and second ends of said each male segment is retainable at two or more different overlapping lengths with respect to a respective adjacent female segment of said pair of opposite, adjacent female segments by respective, two or more stops.

17. A clamp device, comprising:

a first member;

a second member, arranged forming a V-shaped arrangement with the first member;

a hinge, pivotably connecting the first and second members about a pivot axis, wherein an angle formed by the first and second members is adjustable by pivoting said first and second members relative to one another about the pivot axis, and further wherein the hinge comprises a through channel extending along a central longitudinal direction parallel to the pivot axis;

at least one wire receiver carried by at least one of the first member and the second member, the at least one wire receiver comprising an internal space configured to receive at least one wire therethrough; wherein said at least one of the first member and the second member is telescopically length-adjustable to vary a distance between the wire receiver and the pivot axis;

wherein said at least one of the first member and the second member is telescopically length-adjustable between an extended configuration and a retracted configuration;

wherein said at least one of the first member and the second member comprises one or more male segments and one or more female segments, the male and female segments arranged longitudinally alternate, wherein opposite first and second ends of each male segment of the one or more male segments are adjustably insertable into a pair of opposite, adjacent female segments of the one or more female segments, respectively, to telescopically vary a length of said at least one of the first member and the second member; and wherein each one of said first and second ends of said each male segment is retainable at two or more different overlapping lengths with respect to a respective adjacent female segment of said pair of opposite, adjacent female segments by respective, two or more stops.

* * * * *